(12) United States Patent
Okaniwa et al.

(10) Patent No.: US 9,000,123 B2
(45) Date of Patent: Apr. 7, 2015

(54) POLYMER, METHOD FOR MANUFACTURING THE SAME, AND FILM

(75) Inventors: Motoki Okaniwa, Tokyo (JP); Takaaki Uno, Tokyo (JP); Shintaro Fujitomi, Tokyo (JP); Takashi Okada, Tokyo (JP)

(73) Assignee: JSR Corporation, Tokyo (JP)

( * ) Notice: Subject to any disclaimer, the term of this patent is extended or adjusted under 35 U.S.C. 154(b) by 87 days.

(21) Appl. No.: 13/813,686

(22) PCT Filed: Jul. 28, 2011

(86) PCT No.: PCT/JP2011/067276
§ 371 (c)(1),
(2), (4) Date: Feb. 1, 2013

(87) PCT Pub. No.: WO2012/017915
PCT Pub. Date: Feb. 9, 2012

(65) Prior Publication Data
US 2013/0130012 A1  May 23, 2013

(30) Foreign Application Priority Data
Aug. 3, 2010  (JP) .................. 2010-174895

(51) Int. Cl.
*C08G 65/34* (2006.01)
*C08G 65/48* (2006.01)
*C08G 65/40* (2006.01)
*C08L 71/00* (2006.01)
*C08G 65/00* (2006.01)

(52) U.S. Cl.
CPC ............... *C08G 65/48* (2013.01); *C08G 65/40* (2013.01); *C08L 71/00* (2013.01)

(58) Field of Classification Search
USPC .................................. 528/422, 425
See application file for complete search history.

(56) References Cited

U.S. PATENT DOCUMENTS

2013/0030116 A1  1/2013  Okaniwa et al.

FOREIGN PATENT DOCUMENTS

| JP | 60-179424 | 9/1985 |
| JP | 63-270733 | 11/1988 |
| JP | 02-045526 | 2/1990 |
| JP | 10-338807 | 12/1998 |
| JP | 2004-263021 | 9/2004 |
| JP | 2006-199746 | 8/2006 |
| JP | 2006-232974 | 9/2006 |
| WO | WO 2011/136098 | 11/2011 |
| WO | WO 2012/005346 | 1/2012 |

OTHER PUBLICATIONS

International Search Report for corresponding International Application No. PCT/JP2011/067276, Sep. 20, 2011.
Japanese Office Action for corresponding JP Application No. 2012-527700, Nov. 13, 2012.
Combined Chinese Office Action and Search Report issued Jul. 22, 2014 in Patent Application No. 201180037956.3 (with English translation of categories of cited documents).
Frank W. Mercer, et al., "Synthesis and properties of new alternating copolyethers containing pendent cyano groups", Polymer, vol. 35, No. 24, 1994, pp. 5355-5363 and Cover Page.

*Primary Examiner* — Duc Truong
(74) *Attorney, Agent, or Firm* — Oblon, McClelland, Maier & Neustadt, L.L.P.

(57) ABSTRACT

A polymer comprising: at least one structural unit (i) selected from the group consisting of a structural unit represented by formula (1) below and a structural unit represented by formula (2) below, wherein a terminal structure of said polymer is independently a structural unit represented by formula (5) below or a structural unit represented by formula (6) below.

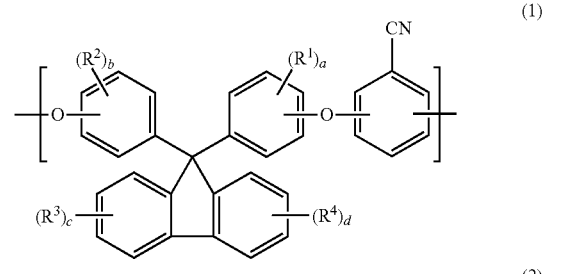  (1)
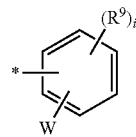  (5)
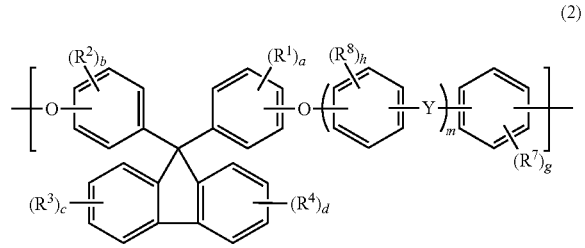  (2)
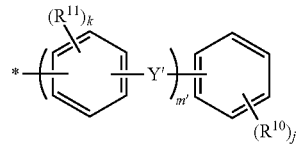  (6)
17 Claims, 3 Drawing Sheets

POLYMER, METHOD FOR MANUFACTURING THE SAME, AND FILM

TECHNICAL FIELD

The present invention relates to a novel polymer, a method for manufacturing the same, and a film. More particularly, the present invention relates to an aromatic polyether-based polymer and a method for manufacturing the same.

BACKGROUND ART

With the recent, remarkable development of information technology which has given rise to a trend for information devices that are lighter, thinner and smaller, transparent resins have been used as optical materials in various applications. Typical examples of the transparent resins are poly(methylmethacrylate) resins (PMMA) and polycarbonate resins. The PMMA and polycarbonate, though excellent in transparency, have low glass transition temperature and insufficient heat resistance, and thus are difficult to use in applications requiring high heat resistance. On the other hand, with technology advancement, the applications of engineering plastics have become wider, and polymers excellent in heat resistance, mechanical strength and transparency are demanded.

As a polymer excellent in heat resistance, mechanical strength and transparency, aromatic polyethers obtained by reacting 9,9-bis(4-hydroxyphenyl)fluorene and 2,6-dihalogented benzonitrile are proposed (Patent Literatures 1 and 2).

CITATION LIST

Patent Literatures

Patent Literature 1: JP-A-2006-199746
Patent Literature 2: JP-A-H02-45526

SUMMARY OF INVENTION

Technical Problem

However, films containing the aromatic polyethers described in the above Patent Literatures 1 and 2 have insufficient coloration resistance in some cases.

The present invention has been made in view of the above problem. It is an object of the present invention to provide a polymer having less coloration and being excellent in heat resistance and light transmission property, and a method for manufacturing the same.

Technical Solution

As a result of diligent research, the present inventors discovered that the problem described above can be solved by a polymer comprising a specific structural unit, in which a terminal structure of the polymer is a specific structural unit. Thus, the present invention was achieved.

That is, the present invention provides the following [1] to [11].

[1] A polymer comprising: at least one structural unit (i) selected from the group consisting of a structural unit represented by formula (1) below and a structural unit represented by formula (2) below, wherein a terminal structure of said polymer is independently a structural unit represented by formula (5) below or a structural unit represented by formula (6) below.

[Chem. 1]

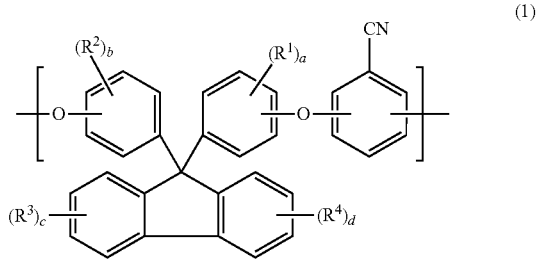

In formula (1), $R^1$ to $R^4$ are each independently a monovalent organic group having from 1 to 12 carbons; and "a" to "d" are each independently an integer from 0 to 4.

[Chem. 2]

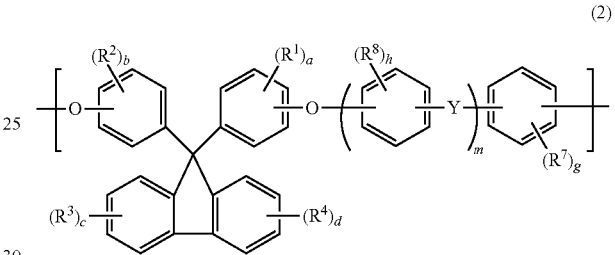

In formula (2), $R^1$ to $R^4$ and "a" to "d" are each independently synonymous with $R^1$ to $R^4$ and "a" to "d" in formula (1); Y is a single bond, $-SO_2-$ or $>C=O$; $R^7$ and $R^8$ are each independently a halogen atom, a monovalent organic group having from 1 to 12 carbons or a nitro group; "g" and "h" are each independently an integer from 0 to 4; and "m" is 0 or 1; provided that when "m" is 0, $R^7$ is not a nitrile group.

[Chem. 3]

In formula (5), W is an electron-withdrawing group; $R^9$ is independently a monovalent organic group having from 1 to 12 carbons; "i" is an integer from 0 to 4; and the symbol "*" indicates a bonding site.

[Chem. 4]

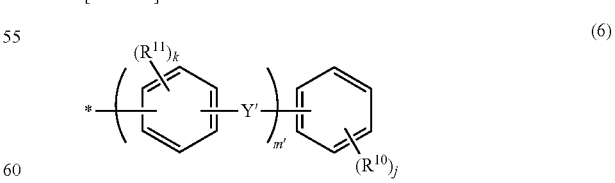

In formula (6), Y' is a single bond, $-SO_2-$ or $>C=O$; $R^{10}$ and $R^{11}$ are each independently a monovalent organic group having from 1 to 12 carbons or a nitro group; "j" is an integer from 0 to 5; "k" is an integer from 0 to 4; "m'" is 0 or 1; and the symbol "*" indicates a bonding site.

[2] The polymer according to [1], further comprising at least one structural unit (ii) selected from the group consisting of a structural unit represented by formula (3) below and a structural unit represented by formula (4) below.

[Chem. 5]

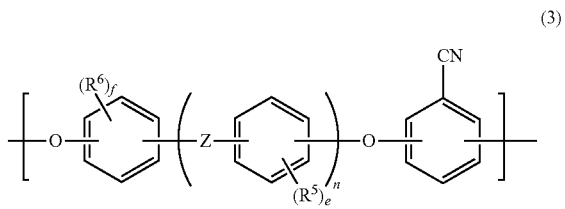

(3)

In formula (3), $R^5$ and $R^6$ are each independently a monovalent organic group having from 1 to 12 carbons; Z is a single bond, —O—, —S—, —SO$_2$—, >C=O, —CONH—, —COO— or a divalent organic group having from 1 to 12 carbons; "e" and "f" are each independently an integer from 0 to 4; and "n" is an integer from 0 to 2.

[Chem. 6]

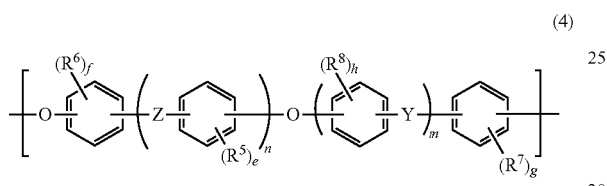

(4)

In formula (4), $R^7$, $R^8$, Y, "m", "g" and "h" are each independently synonymous with $R^7$, $R^8$, Y, "m", "g" and "h" of formula (2); and $R^5$, $R^6$, Z, "n", "e" and "f" are each independently synonymous with $R^5$, $R^6$, Z, "n", "e" and "f" of formula (3); provided that when "m" is 0, $R^7$ is not a nitrile group.

[3] The polymer according to [1] or [2], wherein a molar ratio of the structural unit (i) to the structural unit (ii) in the polymer is from 50:50 to 100:0.

[4] The polymer according to any one of [1] to [3], wherein weight average molecular weight determined by gel permeation chromatography (GPC) relative to polystyrene is from 5,000 to 500,000.

[5] A method for manufacturing the polymer according to any one of [1] to [4], the method comprising a step of reacting:
a component (A) comprising at least one compound selected from the group consisting of a compound represented by formula (7) below and a compound represented by formula (8) below;

a component (B) comprising a compound represented by formula (9) below; and a component (C) comprising at least one compound selected from the group consisting of a compound represented by formula (11) below and a compound represented by formula (12) below.

[Chem. 7]

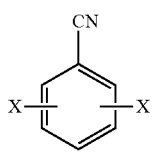

(7)

In formula (7), X are each independently a halogen atom.

[Chem. 8]

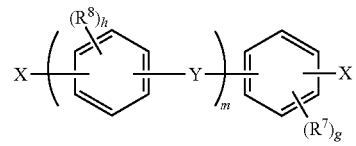

(8)

In formula (8), $R^7$, $R^8$, Y, "m", "g" and "h" are each independently synonymous with $R^7$, $R^8$, Y, "m", "g" and "h" of formula (2); and X are each independently synonymous with X of formula (7); provided that when "m" is 0, $R^7$ is not a nitrile group.

[Chem. 9]

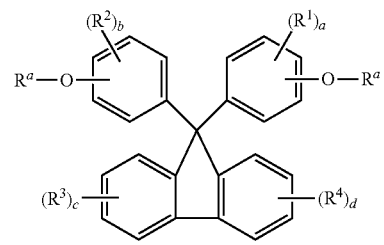

(9)

In formula (9), $R^a$ are each independently a hydrogen atom, a methyl group, an ethyl group, an acetyl group, a methanesulphonyl group or a trifluoromethylsulphonyl group; and $R^1$ to $R^4$ and "a" to "d" are each independently synonymous with $R^1$ to $R^4$ and "a" to "d" in formula (1).

[Chem. 10]

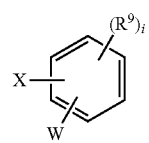

(11)

In formula (11), W, $R^9$ and "i" are each independently synonymous with W, $R^9$ and "i" in formula (5); and X is a halogen atom.

[Chem. 11]

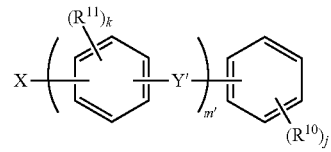

(12)

In formula (12), Y', $R^{10}$, $R^{11}$, "j", "k" and "m'" are each independently synonymous with Y', $R^{10}$, $R^{11}$, "j", "k" and "m'" of formula (6); and X is a halogen atom.

[6] A method for manufacturing the polymer according to any one of [1] to [4], the method comprising a step of reacting:

the component (A), the component (B) and a compound represented by formula (13) below.

[Chem. 12]

$$M(\!-\!OR)_p \quad (13)$$

In formula (13), M is a metal atom; R is a monovalent organic group having from 1 to 18 carbons; and "p" indicates the valency of the metal atom.

[7] A polymer composition comprising: the polymer described in any one of [1] to [4] or a polymer obtained via the method for manufacturing the polymer described in [5] or [6]; and an organic solvent.

[8] A film comprising: the polymer described in any one of [1] to [4] or a polymer obtained via the method for manufacturing the polymer described in claim [5] or [6].

[9] The film according to [8], wherein the film, when having a thickness of 30 μm, has a total light transmittance in accordance with JIS K7105 transparency testing methods of not less than 85%.

[10] The film according to [8] or [9], wherein when the film is dissolved in dimethylacetamide to obtain a solution and the concentration of the polymer described in any one of [1] to [4] in the solution is 10 wt %, a YI value (yellow index) of the solution is not greater than 7.

[11] The film according to any one of [8] to [10], wherein, when the film has a thickness of 30 μm, retardation (Rth) in a thickness direction is not greater than 200 nm.

Advantageous Effects of Invention

The polymer of the present invention has low coloration and excellent heat resistance and light transmittance and, therefore, can be suitably used as a film for a light guide plate, a film for a polarizing plate, a film for a display, a film for an optical disk, a transparent conductive film, a waveguide plate, an optical filter, a back grinding tape, a transparent flexible printed circuit board, a substrate for an organic semiconductor, an optical member for a camera, a connector member, a transport tape, an illumination member, a solar cell member, and the like.

Additionally, the film of the present invention comprises the polymer having low coloration and excellent heat resistance and light transmittance and, therefore, can be suitably used in various applications.

Moreover, the polymer composition of the present invention can be suitably used, principally for manufacturing the film described above.

DESCRIPTION OF EMBODIMENTS

Polymer

Figure 1:
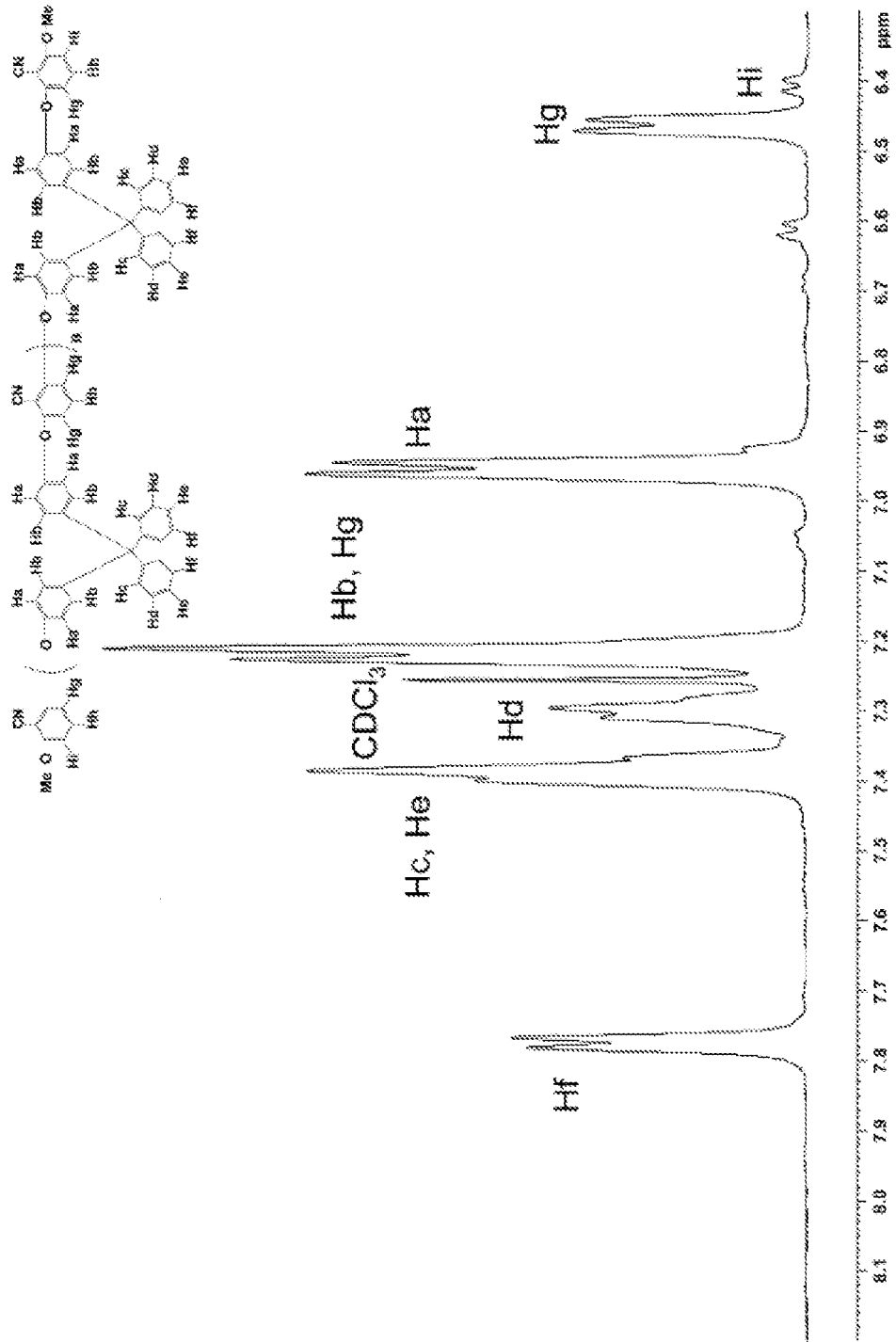
FIG. 1 illustrates the $^1$H-NMR spectrum of a polymer 5 obtained in Example 5.

A polymer of the present invention comprises at least one structural unit (i) selected from the group consisting of a structural unit represented by formula (1) below (hereinafter referred to as "structural unit (1)") and a structural unit represented by formula (2) below (hereinafter referred to as "structural unit (2)"). Additionally, a terminal structure of said polymer is independently a structural unit represented by formula (5) below (hereinafter referred to as "structural unit (5)") or a structural unit represented by formula (6) below (hereinafter referred to as "structural unit (6)").

The polymer of the present invention includes: (I) a polymer where either of the two terminals of the main chain is the structural unit (5) or the structural unit (6); (II) a polymer where both of the terminals of the main chain are the structural unit (5) or the structural unit (6); and (III) a polymer where one of the two terminals of the main chain is the structural unit (5) and the other is the structural unit (6).

The polymer of the present invention comprises the structural unit (i) and the terminal structure of the polymer is constituted by the structural unit (5) or the structural unit (6). Therefore, the polymer of the present invention has excellent heat resistance and light transmittance and has low coloration. Particularly, the main chain terminal of the polymer of the present invention is constituted by the structural unit (5) or the structural unit (6) and, therefore, compared with a polymer comprising chlorine or similar atoms at the main chain terminals, coloration resistance, heat coloration resistance, and the like are excellent. Therefore, the polymer of the present invention can be suitably used as a film for a light guide plate, a film for a polarizing plate, a film for a display, a film for an optical disk, a transparent conductive film, a waveguide plate, an optical filter, a back grinding tape, a transparent flexible printed circuit board, a substrate for an organic semiconductor, an optical member for a camera, a connector member, a transport tape, an illumination member, a solar cell member, and the like.

[Chem. 13]

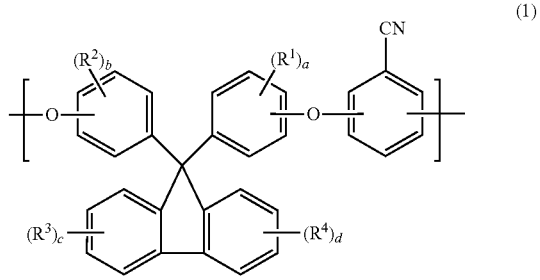

(1)

In formula (1), $R^1$ to $R^4$ are each independently a monovalent organic group having from 1 to 12 carbons; and "a" to "d" are each independently an integer from 0 to 4 and preferably 0 or 1. "a" and "b" are preferably 1.

Examples of the monovalent organic group having from 1 to 12 carbons include a monovalent hydrocarbon group having from 1 to 12 carbons, and a monovalent organic group having from 1 to 12 carbons and containing at least one kind of atom selected from the group consisting of an oxygen atom and a nitrogen atom.

Examples of the monovalent hydrocarbon group having from 1 to 12 carbons include a linear or branched hydrocarbon group having from 1 to 12 carbons, an alicyclic hydrocarbon group having from 3 to 12 carbons and an aromatic hydrocarbon group having from 6 to 12 carbons.

The linear or branched hydrocarbon group having from 1 to 12 carbons is preferably a linear or branched hydrocarbon group having from 1 to 8 carbons, and more preferably a linear or branched hydrocarbon group having from 1 to 5 carbons.

Specific preferable examples of the linear or branched hydrocarbon group include methyl groups, ethyl groups, n-propyl groups, isopropyl groups, n-butyl groups, sec-butyl groups, tert-butyl groups, n-pentyl groups, n-hexyl groups and n-heptyl groups.

The alicyclic hydrocarbon group having from 3 to 12 carbons is preferably an alicyclic hydrocarbon group having from 3 to 8 carbons, and more preferably an alicyclic hydrocarbon group having from 3 or 4 carbons.

Specific preferable examples of the alicyclic hydrocarbon group having from 3 to 12 carbons include cycloalkyl groups such as a cyclopropyl group, a cyclobutyl group, a cyclopentyl group and a cyclohexyl group; and cycloalkenyl groups such as a cyclobutenyl group, a cyclopentenyl group and a cyclohexenyl group. A binding site of the alicyclic hydrocarbon group may be at any carbon on the alicyclic ring.

Examples of the aromatic hydrocarbon group having from 6 to 12 carbons include phenyl groups, biphenyl groups and naphthyl groups. A binding site of the aromatic hydrocarbon group may be at any carbon on the aromatic ring.

Examples of the organic group having from 1 to 12 carbons and containing an oxygen atom include an organic group having a hydrogen atom, a carbon atom and an oxygen atom. Among these, preferable examples include an organic group having from 1 to 12 carbons in total and containing a hydrocarbon group and an ether bond, a carbonyl group or an ester bond.

Examples of the organic group having from 1 to 12 carbons in total and containing an ether bond include an alkoxy group having from 1 to 12 carbons, an alkenyloxy group having from 2 to 12 carbons, an alkynyloxy group having from 2 to 12 carbons, an aryloxy group having from 6 to 12 carbons and an alkoxyalkyl group having from 2 to 12 carbons. Specific examples thereof include methoxy groups, ethoxy groups, propoxy groups, isopropyloxy groups, butoxy groups, phenoxy groups, propenyloxy groups, cyclohexyloxy groups, methoxy methyl groups, alkyl substituted phenoxy groups (where the number of carbons of the alkyl group is from 1 to 4 and the number of alkyl groups is from 1 to 5) and phenyl substituted phenoxy groups (where the number of phenyl groups is 1 or 2).

Examples of the organic group having from 1 to 12 carbons in total and containing a carbonyl group include an acyl group having from 2 to 12 carbons. Specific examples thereof include acetyl groups, propionyl groups, isopropionyl groups and benzoyl groups.

Examples of the organic group having from 1 to 12 carbons in total and containing an ester group include an acyloxy group having from 2 to 12 carbons. Specific examples thereof include acetyloxy groups, propionyloxy groups, isopropionyloxy groups and benzoyloxy groups.

Examples of the organic group having from 1 to 12 carbons and containing a nitrogen atom include an organic group containing a hydrogen atom, a carbon atom and a nitrogen atom. Specific examples thereof include cyano groups, imidazole groups, triazole groups, benzimidazole groups and benzotriazole groups.

Examples of the organic group having from 1 to 12 carbons and containing an oxygen atom and a nitrogen atom include an organic group containing a hydrogen atom, a carbon atom, an oxygen atom and a nitrogen atom. Specific examples thereof include oxazole groups, oxadiazole groups, benzoxazole groups and benzoxadiazole groups.

As the $R^1$ to $R^4$ in the formula (1), a monovalent hydrocarbon group having from 1 to 12 carbons is preferred; an aromatic hydrocarbon group having from 6 to 12 carbons is more preferred; and a phenyl group is still more preferred.

In formula (1), when "a" and/or "b" is 1, binding sites of the $R^1$ and $R^2$ on the benzene ring are preferably at the ortho position with respect to the binding sites to the benzene ring of the main-chain bonds (ether bonds) bonded to each of the benzene rings, because obtaining of a polymer comprising the structural unit (1) is facilitated. Additionally, in this case, $R^1$ and $R^2$ are preferably sterically bulky groups such as methyl groups and phenyl groups. Note that hereinafter, the same holds true for binding sites and preferable groups in structural units and compounds comprising groups with the same reference numerals. For example, preferable binding sites and groups for $R^1$ and $R^2$ are synonymous in structural unit (2) below.

[Chem. 14]

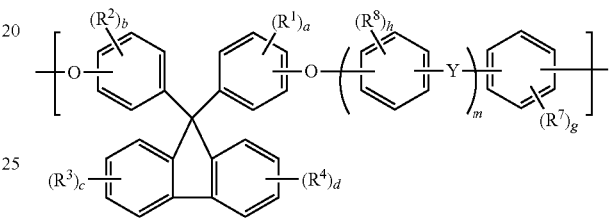

(2)

In formula (2), $R^2$ to $R^4$ and "a" to "d" are each independently synonymous with $R^2$ to $R^4$ and "a" to "d" in formula (1); Y is a single bond, —SO$_2$— or >C=O; $R^7$ and $R^8$ are each independently a halogen atom, a monovalent organic group having from 1 to 12 carbons or a nitro group; and "m" is 0 or 1; provided that when "m" is 0, $R^7$ is not a nitrile group. "g" and "h" are each independently an integer from 0 to 4, preferably 0 or 1.

Examples of the monovalent organic group having from 1 to 12 carbons include organic groups synonymous with the monovalent organic group having from 1 to 12 carbons in formula (1), and the like.

In formula (2), when "g" and/or "h" is 1, binding sites of the $R^7$ and $R^8$ on the benzene ring are preferably at the ortho position with respect to the binding sites to the benzene ring of the main-chain bonds bonded to each of the benzene rings, because obtaining of a polymer comprising the structural unit (2) is facilitated. When "m" is 1 and "g" is 1, the binding site of $R^7$ on the benzene ring is preferably at the ortho position with respect to the binding site of the ether bond on the benzene ring. Additionally, in this case, $R^7$ and $R^8$ are preferably sterically bulky groups such as methyl groups and phenyl groups. Note that hereinafter, the same holds true for binding sites and preferable groups in structural units and compounds comprising groups with the same reference numerals.

From the perspectives of optical properties, heat resistance and mechanical properties, a molar ratio of the structural unit (1) to the structural unit (2) of the polymer of the present invention (provided that the sum of both structural units (structural unit (1)+structural unit (2)) is 100) is preferably such that structural unit (1):structural unit (2)=50:50 to 100:0, more preferably such that structural unit (1):structural unit (2)=70:30 to 100:0, and even more preferably such that structural unit (1):structural unit (2)=80:20 to 100:0.

As used herein, "mechanical properties" refer to properties of the polymer, such as tensile strength, elongation at break and tensile elastic modulus.

[Chem. 15]

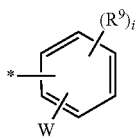

(5)

In formula (5), W is an electron-withdrawing group; $R^9$ is independently a monovalent organic group having from 1 to 12 carbons; "i" is an integer from 0 to 4; and the symbol "*" indicates a bonding site.

Examples of the monovalent organic group having from 1 to 12 carbons include organic groups synonymous with the monovalent organic group having from 1 to 12 carbons in formula (1) and the like.

The electron-withdrawing group W in formula (5) is not particularly limited, and examples thereof include nitrogen-containing dipolar groups such as nitro groups and nitrile groups; groups containing carbonyl groups such as acetyl groups and aldehyde groups; and groups containing halogen atoms such as trifluoromethyl groups. Of these, from the perspectives of reactivity, availability and cost, a nitrogen-containing dipolar group is preferable and a nitro group or a nitrile group is more preferable.

$R^9$ in formula (5) is preferably an aromatic hydrocarbon group having from 6 to 12 carbons, an alkoxy group having from 1 to 12 carbons, an aryloxy group having from 6 to 12 carbons, or the like; more preferably a phenyl group, a methoxy group, an ethoxy group, a propoxy group, an isopropyloxy group, a butoxy group, a phenoxy group, a cyclohexyloxy group, a methoxy methyl group, an alkyl substituted phenoxy group (where the number of carbons of the alkyl group is from 1 to 4 and the number of alkyl groups is from 1 to 5), a phenyl substituted phenoxy group (where the number of phenyl groups is 1 or 2); and even more preferably a methoxy group, an alkyl substituted phenoxy group (where the number of carbons of the alkyl group is from 1 to 4 and the number of alkyl groups is 1 or 2) or a phenyl substituted phenoxy group (where the number of phenyl groups is 1 or 2).

"i" in formula (5) is preferably 0 or 1 and more preferably 1.

[Chem. 16]

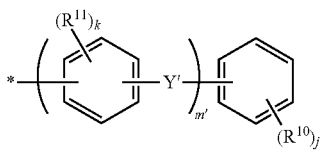

(6)

In formula (6), Y' is a single bond, —$SO_2$— or >C=O; $R^{10}$ and $R^{11}$ are each independently a monovalent organic group having from 1 to 12 carbons or a nitro group; "j" is an integer from 0 to 5; "k" is an integer from 0 to 4; "m'" is 0 or 1; and the symbol "*" indicates a bonding site.

Examples of the monovalent organic group having from 1 to 12 carbons include organic groups synonymous with the monovalent organic group having from 1 to 12 carbons in formula (1) and the like.

$R^{10}$ in formula (6) is preferably an aromatic hydrocarbon group having from 6 to 12 carbons, an alkoxy group having from 1 to 12 carbons, an aryloxy group having from 6 to 12 carbons, or the like; more preferably a phenyl group, a methoxy group, an ethoxy group, a propoxy group, an isopropyloxy group, a butoxy group, a phenoxy group, a cyclohexyloxy group, a methoxy methyl group, an alkyl substituted phenoxy group (where the number of carbons of the alkyl group is from 1 to 4 and the number of alkyl groups is from 1 to 5), a phenyl substituted phenoxy group (where the number of phenyl groups is 1 or 2); and even more preferably a methoxy group, an alkyl substituted phenoxy group (where the number of carbons of the alkyl group is from 1 to 4 and the number of alkyl groups is 1 or 2) or a phenyl substituted phenoxy group (where the number of phenyl groups is 1 or 2).

"j" and "k" in formula (6) are preferably 0 or 1. "j" in formula (6) is more preferably 1.

Additionally, the polymer of the present invention may further comprise at least one structural unit (ii) selected from the group consisting of a structural unit represented by formula (3) below and a structural unit represented by formula (4) below. The polymer of the present invention preferably comprises this structural unit (ii) because a film comprising such a polymer has improved mechanical properties.

[Chem. 17]

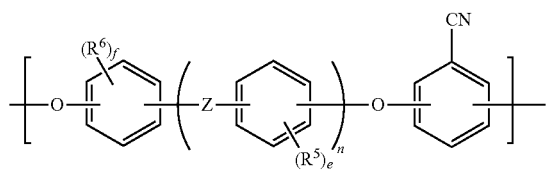

(3)

In formula (3), $R^5$ and $R^6$ are each independently a monovalent organic group having from 1 to 12 carbons; Z is a single bond, —O—, —S—, —$SO_2$—, >C=O, —CONH—, —COO— or a divalent organic group having from 1 to 12 carbons; and "n" is an integer from 0 to 2. "e" and "f" are each independently an integer from 0 to 4, preferably 0 or 1.

Examples of the monovalent organic group having from 1 to 12 carbons include organic groups synonymous with the monovalent organic group having from 1 to 12 carbons in formula (1), and the like.

Examples of the divalent organic group having from 1 to 12 carbons include a divalent hydrocarbon group having from 1 to 12 carbons, a divalent halogenated hydrocarbon group having from 1 to 12 carbons, a divalent organic group having from 1 to 12 carbons and containing at least one kind of atom selected from the group consisting of an oxygen atom and a nitrogen atom, and a divalent halogenated organic group having from 1 to 12 carbons and containing at least one kind of atom selected from the group consisting of an oxygen atom and a nitrogen atom.

Examples of the divalent hydrocarbon group having from 1 to 12 carbons include a linear or branched divalent hydrocarbon group having from 1 to 12 carbons, a divalent alicyclic hydrocarbon group having from 3 to 12 carbons and a divalent aromatic hydrocarbon group having from 6 to 12 carbons.

Examples of the linear or branched divalent hydrocarbon group having from 1 to 12 carbons include methylene groups, ethylene groups, trimethylene groups, isopropylidene groups, pentamethylene groups, hexamethylene groups and heptamethylene groups.

Examples of the divalent alicyclic hydrocarbon group having from 3 to 12 carbons include cycloalkylene groups such as a cyclopropylene group, a cyclobutylene group, a cyclopentylene group and a cyclohexylene group; and cycloalkenylene groups such as a cyclobutenylene group, a cyclopentenylene group and a cyclohexenylene group. A binding site of the alicyclic hydrocarbon group may be at any carbon on the alicyclic ring.

Examples of the divalent aromatic hydrocarbon group having from 6 to 12 carbons include phenylene groups, naphthylene groups and biphenylene groups. A binding site of the aromatic hydrocarbon group may be at any carbon on the aromatic ring.

Examples of the divalent halogenated hydrocarbon group having from 1 to 12 carbons include a linear or branched divalent halogenated hydrocarbon group having from 1 to 12 carbons, a divalent halogenated alicyclic hydrocarbon group having from 3 to 12 carbons and a divalent halogenated aromatic hydrocarbon group having from 6 to 12 carbons.

Examples of the linear or branched divalent halogenated hydrocarbon group having from 1 to 12 carbons include difluoromethylene groups, dichloromethylene groups, tetrafluoroethylene groups, tetrachloroethylene groups, hexafluorotrimethylene groups, hexachlorotrimethylene groups, hexafluoroisopropylidene groups and hexachloroisopropylidene groups.

Examples of the divalent halogenated alicyclic hydrocarbon group having from 3 to 12 carbons include a group obtained by substituting at least one hydrogen atom of a group exemplified in the divalent alicyclic hydrocarbon group having from 3 to 12 carbons with a fluorine atom, a chlorine atom, a bromine atom or an iodine atom.

Examples of the divalent halogenated aromatic hydrocarbon group having from 6 to 12 carbons include a group obtained by substituting at least one hydrogen atom of a group exemplified in the divalent aromatic hydrocarbon group having from 6 to 12 carbons with a fluorine atom, a chlorine atom, a bromine atom or an iodine atom.

Examples of the organic group having from 1 to 12 carbons and containing at least one kind of atom selected from the group consisting of an oxygen atom and a nitrogen atom include an organic group containing a hydrogen atom, a carbon atom, an oxygen atom and/or a nitrogen atom. Examples thereof include a divalent organic group having from 1 to 12 carbons in total and containing a hydrocarbon group and an ether bond, a carbonyl group, an ester bond or an amide bond.

Examples of the divalent halogenated organic group having from 1 to 12 carbons and containing at least one kind of atom selected from the group consisting of an oxygen atom and a nitrogen atom include a group obtained by substituting at least one hydrogen atom of a group exemplified in the divalent organic group having from 1 to 12 carbons and containing at least one kind of atom selected from the group consisting of an oxygen atom and a nitrogen atom with a fluorine atom, a chlorine atom, a bromine atom or an iodine atom.

In formula (3), when "e" and/or "f" is 1, binding sites of the $R^5$ and $R^6$ on the benzene ring are preferably at the ortho position with respect to the binding sites on the benzene ring of the ether bonds bonded to each of the benzene rings, because obtaining of a polymer comprising the structural unit (3) is facilitated. Additionally, in this case, $R^5$ and $R^6$ are preferably sterically bulky groups such as methyl groups and phenyl groups. Note that hereinafter, the same holds true for binding sites and preferable groups in structural units and compounds comprising groups with the same reference numerals.

Z in formula (3) is preferably a single bond, —O—, —SO$_2$—, >C=O, or a divalent organic group having from 1 to 12 carbons; and more preferably a divalent hydrocarbon group having from 1 to 12 carbons, or a divalent halogenated hydrocarbon group having from 1 to 12 carbons. The divalent hydrocarbon group having from 1 to 12 carbons is preferably a linear or branched divalent hydrocarbon group having from 1 to 12 carbons or a divalent alicyclic hydrocarbon group having from 3 to 12 carbons.

[Chem. 18]

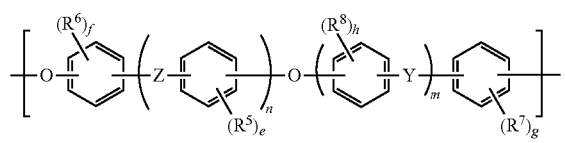

(4)

In formula (4), $R^7$, $R^8$, Y, "m", "g" and "h" are each independently defined in the same manner as described for $R^7$, $R^8$, Y, "m", "g" and "h" of the formula (2); and $R^5$, $R^6$, Z, "n", "e" and "f" are each independently defined in the same manner as described for $R^5$, $R^6$, Z, "n", "e" and "f" of the formula (3). Note that when "m" is 0, $R^7$ is not a nitrile group.

From the perspectives of optical properties, heat resistance and mechanical properties, a molar ratio of the structural unit (i) to the structural unit (ii) of the polymer of the present invention (provided that the sum of both structural units (structural unit (i)+structural unit (ii)) is 100) is preferably such that structural unit (i):structural unit (ii)=50:50 to 100:0, more preferably such that structural unit (i):structural unit (ii)=70:30 to 100:0, and even more preferably such that structural unit (i): structural unit (ii)=80:20 to 100:0.

From the perspectives of optical properties, heat resistance and mechanical properties, with polymer of the present invention, the structural unit (i) and the structural unit (ii) preferably constitute not less than 70 mol % of all the structural units, and more preferably constitute not less than 95 mol % of all the structural units.

Process for Synthesizing the Polymer

The polymer of the present invention can, for example, be obtained through production method 1, 2 or 3 described below.

With the polymer of the present invention, high-temperature treating in order to achieve the imidization necessary for synthesis of the polyimide-based polymer is not needed and, therefore, the production process load of the polymer can be reduced and the polymer can be easily manufactured.

Production Method 1

First, production method 1 is described in detail. Production method 1 is a method in which:

a component (A) comprising at least one compound selected from the group consisting of a compound represented by formula (7) below (hereinafter referred to as "compound (7)") and a compound represented by formula (8) below (hereinafter referred to as "compound (8)");

a component (B) comprising a compound represented by formula (9) below (hereinafter referred to as "compound (9)"); and a component (C) comprising at least one compound selected from the group consisting of a compound represented by formula (11) below (hereinafter referred to as "compound (II)") and a compound represented by formula

(12) below (hereinafter referred to as "compound (12)") are reacted (hereinafter referred to as "reaction 1").

In the reaction 1, the component (C) may be reacted simultaneously when reacting the component (A) and the component (B), or the component (C) may be reacted after reacting the component (A) and the component (B).

[Chem. 19]

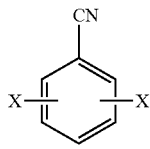

(7)

In formula (7), X are each independently a halogen atom, preferably a fluorine atom.

[Chem. 20]

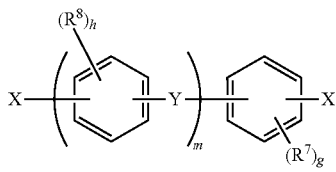

(8)

In formula (8), $R^7$, $R^8$, Y, "m", "g" and "h" are each independently synonymous with $R^7$, $R^8$, Y, "m", "g" and "h" of formula (2); and X are each independently synonymous with X of the formula (7). However, when "m" is 0, $R^7$ is not a nitrile group.

[Chem. 21]

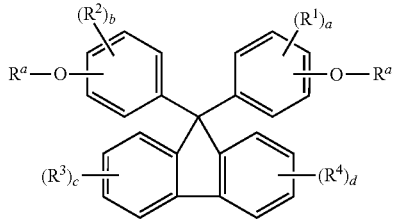

(9)

In formula (9), $R^a$ are each independently a hydrogen atom, a methyl group, an ethyl group, an acetyl group, a methanesulfonyl group or a trifluoromethylsulfonyl group. Among these, a hydrogen atom is preferred. In formula (9), $R^1$ to $R^4$ and "a" to "d" are each independently defined in the same manner as $R^1$ to $R^4$ and "a" to "d" of the formula (1).

[Chem. 22]

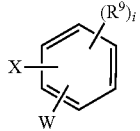

(11)

In formula (11), W, $R^9$ and "i" are each independently synonymous with W, $R^9$ and "i" in formula (5). X is a halogen atom, preferably a fluorine atom.

[Chem. 23]

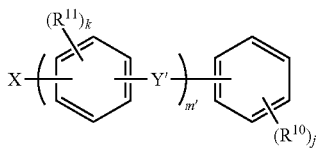

(12)

In formula (12), Y', $R^9$, $R^{11}$, "j", "k" and "m'" are each independently synonymous with Y', $R^{10}$, $R^{11}$, "j", "k" and "m'" of formula (6). X is a halogen atom, preferably a fluorine atom.

Specific examples of the compound (7) include 2,6-difluorobenzonitrile, 2,5-difluorobenzonitrile, 2,4-difluorobenzonitrile, 2,6-dichlorobenzonitrile, 2,5-dichlorobenzonitrile, 2,4-dichlorobenzonitrile, and reactive derivatives thereof. In particular, from the perspectives of reactivity, cost performance, and the like, 2,6-difluorobenzonitrile and 2,6-dichlorobenzonitrile are preferably used. Combinations of two or more types of these compounds can be used.

Specific examples of the compound (8) include 4,4'-difluorobenzophenone, 4,4'-difluorodiphenylsulphone, 2,4'-difluorobenzophenone, 2,4'-difluorodiphenylsulphone, 2,2'-difluorobenzophenone, 2,2'-difluorodiphenylsulphone, 3,3'-dinitro-4,4'-difluorobenzophenone, 3,3'-dinitro-4,4'-difluorodiphenylsulphone, 4,4'-dichlorobenzophenone, 4,4'-dichlorodiphenylsulphone, 2,4'-dichlorobenzophenone, 2,4'-dichlorodiphenylsulphone, 2,2'-dichlorobenzophenone, 2,2'-dichlorodiphenylsulphone, 3,3'-dinitro-4,4'-dichlorobenzophenone, 3,3'-dinitro-4,4'-dichlorodiphenylsulphone, pentafluorobiphenyl, 4,4'-diiodobiphenyl, 3,3'-diiodobiphenyl, 2,2'-diiodobiphenyl, 4,4'-dibromobiphenyl, 3,3'-dibromobiphenyl, 2,2'-dibromobiphenyl, 4,4'-dichlorobiphenyl, 3,3'-dichlorobiphenyl, 2,2'-dichlorobiphenyl, 4,4'-difluorobiphenyl, 3,3'-difluorobiphenyl, 2,2'-difluorobiphenyl, 4,4'-bromo iodobiphenyl, and the like. Combinations of two or more types of these compounds can be used.

Specific examples of the compound (9) include 9,9-bis(4-hydroxyphenyl)fluorene, 9,9-bis(3-phenyl-4-hydroxyphenyl)fluorene, 9,9-bis(3,5-diphenyl-4-hydroxyphenyl)fluorene, 9,9-bis(4-hydroxy-3-methylphenyl)fluorene, 9,9-bis(4-hydroxy-3,5-dimethylphenyl)fluorene, 9,9-bis(4-hydroxy-3-cyclohexylphenyl)fluorene, and reactive derivatives thereof. Of these compounds, 9,9-bis(4-hydroxyphenyl)fluorene, 9,9-bis(3-phenyl-4-hydroxyphenyl)fluorene and 9,9-bis(4-hydroxy-3-methylphenyl)fluorene can be preferably used. Combinations of two or more types of these compounds can be used.

Examples of the compound (II) include 4-fluorobenzonitrile, 4-chlorobenzonitrile, 2-fluorobenzonitrile, 2-chlorobenzonitrile, 4-fluoronitrobenzene, 4-chloronitrobenzene, 2-fluoronitrobenzene, 2-chloronitrobenzene, 4-fluoroacetophenone, 4-chloroacetophenone, 2-fluoroacetophenone, 2-chloroacetophenone, 4-fluorobenzaldehyde, 4-chlorobenzaldehyde, 2-fluorobenzaldehyde, 2-chlorobenzaldehyde, 4-fluoro trifluoromethylbenzene, 4-chloro trifluoromethylbenzene, 2-fluoro trifluoromethylbenzene, 2-chloro trifluoromethylbenzene, and the like. Combinations of two or more types of these compounds can be used.

Examples of the compound (12) include 4-fluorobenzophenone, 4-chlorobenzophenone, 4-chlorophenylphenyl sulphone, 4-fluorophenylphenyl sulphone, 2-fluorobenzophenone, 2-chlorobenzophenone, 2-chlorophenylphenyl sulphone, 2-fluorophenylphenyl sulphone, 4-fluoro-3-nitrobenzophenone, 4-chloro-3-nitrobenzophenone, 4-chloro-3-nitrophenylphenyl sulphone, 4-fluoro-3-nitrophenylphenyl sulphone, 2-fluoro-3-nitrobenzophenone, 2-chloro-3-nitrobenzophenone, 2-chloro-3-nitrophenylphenyl sulphone, 2-fluoro-3-nitrophenylphenyl sulphone, 4-fluorobiphenyl, 4-chlorobiphenyl, 3-fluorobiphenyl, 3-chlorobiphenyl, fluorobenzene, chlorobenzene, and the like. Combinations of two or more types of these compounds can be used.

100 mol % of the component (A) preferably contains from 80 mol % to 100 mol % and more preferably from 90 mol % to 100 mol % of the at least one compound selected from the group consisting of the compound (7) and the compound (8).

As necessary, the component (B) preferably comprises a compound represented by formula (10) below.

100 mol % of the component (B) preferably contains from 50 mol % to 100 mol %, more preferably from 80 mol % to 100 mol %, and even more preferably from 90 mol % to 100 mol % of the compound (9).

[Chem. 24]

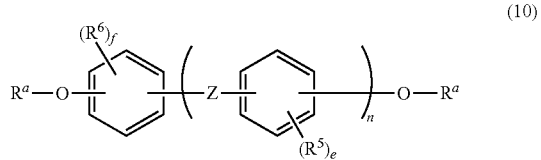

(10)

In formula (10), $R^5$, $R^6$, Z, "n", "e" and "f" are each independently synonymous with $R^5$, $R^6$, Z, "n", "e" and "f" in formula (3); and $R^a$ are each independently synonymous with $R^a$ in formula (9).

Examples of the compound represented by formula (10) include hydroquinone, resorcinol, 2-phenyl hydroquinone, 4,4'-biphenol, 3,3'-biphenol, 4,4'-dihydroxydiphenyl sulphone, 3,3'-dihydroxydiphenyl sulphone, 4,4'-dihydroxybenzophenone, 3,3'-dihydroxybenzophenone, 2,2-bis(4-hydroxyphenyl)propane, 1,1-bis(4-hydroxyphenyl)cyclohexane, 2,2-bis(4-hydroxyphenyl)-1,1,1,3,3,3-hexafluoropropane, 2,2-bis(3-hexyl-4-hydroxyphenyl)propane, α,α'-bis(4-hydroxyphenyl)-1,4-diisopropyl benzene, α,α'-bis(4-hydroxy-3,5-dimethylphenyl)-1,4-diisopropyl benzene, α,α'-bis(4-hydroxyphenyl)-1,3-diisopropyl benzene, α,α'-bis(4-hydroxy-3,5-dimethylphenyl)-1,3-diisopropyl benzene, reactive derivatives thereof, and the like. Combinations of two or more types of these compounds can be used.

Of the compounds described above, resorcinol, 4,4'-biphenol, 2,2-bis(4-hydroxyphenyl)propane, 1,1-bis(4-hydroxyphenyl)cyclohexane, 2,2-bis(4-hydroxyphenyl)-1,1,1,3,3,3-hexafluoropropane and 2,2-bis(3-hexyl-4-hydroxyphenyl)propane are preferable, and from the perspectives of reactivity and mechanical properties, 4,4'-biphenol is particularly preferable. Combinations of two or more types of these compounds can be used.

100 mol % of the component (C) preferably contains from 80 mol % to 100 mol % and more preferably from 90 mol % to 100 mol % of the at least one compound selected from the group consisting of the compound (11) and the compound (12).

More specifically, the polymer of the present invention can be obtained by: reacting the component (B) with an alkali metal compound in an organic solvent in order to obtain an alkali metal salt of the component (B), reacting the obtained alkali metal salt with the component (A) and, thereafter, reacting a portion of the reacted polymer originating from the alkali metal salt of the component (B) with the component (C).

By reacting the component (B) with the alkali metal compound in the presence of the component (A), the alkali metal salt of the component (B) may be reacted with the component (A).

Additionally, the same reaction can be carried out in a system including the components (A), (B) and (C), and the alkali metal compound.

Usage ratios of the component (A) and the component (B) when the total of the component (A) and the component (B) equals 100 mol % are preferably such that the component (A) is used in an amount not less than 45 mol % and not more than 55 mol %, more preferably not less than 48 mol % and not more than 50 mol %, and even more preferably not less than 48 mol % and less than 50 mol %; and preferably such that the component (B) is used in an amount not less than 45 mol % and not more than 55 mol %, more preferably not less than 50 mol % and not more than 52 mol %, and even more preferably greater than 50 mol % and not more than 52 mol %.

Additionally, typically from 0.005 to 0.3 mol and preferably from 0.0075 to 0.2 mol of the component (C) is compounded per 1 mol of a total of the component (A) and the component (B).

In cases where the molar ratio P of the component (B) to the component (A) is such that 1.00<P≤1.05, a usage amount of the component (C) with respect to the molar difference between the usage amounts of the component (A) and the component (B) is preferably from 1 to 20 times by moles, more preferably from 1.5 to 10 times by moles, and even more preferably from 2 to 5 times by moles.

Examples of the alkali metal compound that can be used in the reaction 1 include an alkali metal such as lithium, potassium and sodium; an alkali metal hydride such as lithium hydride, potassium hydride and sodium hydride; an alkali metal hydroxide such as lithium hydroxide, potassium hydroxide and sodium hydroxide; an alkali metal carbonate such as lithium carbonate, potassium carbonate and sodium carbonate; and an alkali metal hydrogen carbonate such as lithium hydrogen carbonate, potassium hydrogen carbonate and sodium hydrogen carbonate. A single alkali metal compound or a combination of two or more alkali metal compounds may be used.

The alkali metal compound is used in an amount such that the amount of metal atoms in the alkali metal compound, with respect to all —O—$R^a$ in component (B), is typically from 1 to 3 times by equivalents, preferably from 1.1 to 2 times by equivalents, and more preferably from 1.2 to 1.5 times by equivalents.

Examples of the organic solvent that can be used in the reaction 1 include N,N-dimethylacetamide, N,N-dimethylformamide, N-methyl-2-pyrrolidone, 1,3-dimethyl-2-imidazolidinone, γ-butyllactone, sulfolane, dimethylsulfoxide, diethylsulfoxide, dimethylsulfone, diethylsulfone, diisopropylsulfone, diphenylsulfone, diphenylether, benzophenone, dialkoxybenzene (the number of carbons of the alkoxy group: 1 to 4) and trialkoxybenzene (the number of carbons of the alkoxy group: 1 to 4). Among these solvents, particularly preferred are polar organic solvents having high dielectric constant such as N-methyl-2-pyrrolidone, N,N-dimethylacetamide, sulfolane, diphenylsulfone and dimethylsulfoxide. A single organic solvent or a combination of two or more organic solvents may be used.

Furthermore, a solvent azeotropic with water, such as benzene, toluene, xylene, hexane, cyclohexane, octane, chlorobenzene, dioxane, tetrahydrofuran, anisole and phenetole can be used in the reaction 1. A single solvent or a combination of two or more solvents may be used.

A reaction temperature of the reaction 1 is preferably from 60° C. to 250° C., more preferably from 80° C. to 200° C., and even more preferably from 100 to 140° C. Reaction time is preferably from 15 minutes to 100 hours, more preferably from 1 hour to 24 hours, and even more preferably from 1 hour to 8 hours.

Production Method 2

Next, production method 2 is described in detail. Production method 2 comprises a step of reacting (hereinafter referred to as "reaction 2") the component (A), the component (B) and a compound represented by formula (13) below (hereinafter referred to as "compound (13)").

In the reaction 2, the compound (13) may be reacted simultaneously when reacting the component (A) and the component (B) (hereinafter referred to as "process (a)"), or the compound (13) may be reacted after reacting the component (A) and the component (B) (hereinafter referred to as "process (b)").

[Chem. 25]

(13)

In formula (13), M is a metal atom; R is a monovalent organic group having from 1 to 18 carbons; and "p" indicates the valency of the metal atom.

In cases where the terminal of the polymer obtained through production process 2 comprises the structural unit (5), $R^9$ in the structural unit (5) is the RO— in formula (13), and "i" is 1. On the other hand, in cases where the terminal of the polymer obtained through production process 2 comprises the structural unit (6), "j" in the structural unit (6) is an integer not less than 1, and at least one $R^{10}$ is the RO— in formula (13).

The metal atom in formula (13) is preferably an alkali metal atom or an alkali earth metal atom, and more preferably is an alkali metal atom.

Examples of the alkali metal atom include potassium, sodium, rubidium, cesium and lithium. Of these, potassium and sodium are preferable.

Examples of the alkali earth metal atom include magnesium, calcium, strontium and barium.

Examples of the monovalent organic group having from 1 to 18 carbons include a monovalent hydrocarbon group having from 1 to 18 carbons, and a monovalent organic group having from 1 to 18 carbons and containing at least one kind of atom selected from the group consisting of an oxygen atom, a nitrogen atom and a sulfur atom.

Examples of the monovalent hydrocarbon group having from 1 to 18 carbons include a linear or branched hydrocarbon group having from 1 to 18 carbons, an alicyclic hydrocarbon group having from 3 to 18 carbons and an aromatic hydrocarbon group having from 6 to 18 carbons.

The linear or branched hydrocarbon group having from 1 to 18 carbons is preferably a linear or branched hydrocarbon group having from 1 to 15 carbons, and more preferably a linear or branched hydrocarbon group having from 1 to 12 carbons.

Specific preferable examples of the linear or branched hydrocarbon group include methyl groups, ethyl groups, n-propyl groups, isopropyl groups, n-butyl groups, sec-butyl groups, tert-butyl groups, n-pentyl groups, n-hexyl groups and n-heptyl groups.

The alicyclic hydrocarbon group having from 3 to 18 carbons is preferably an alicyclic hydrocarbon group having from 3 to 15 carbons, and more preferably an alicyclic hydrocarbon group having from 3 to 12 carbons.

Specific preferable examples of the alicyclic hydrocarbon group having from 3 to 18 carbons include cycloalkyl groups such as a cyclopropyl group, a cyclobutyl group, a cyclopentyl group and a cyclohexyl group; and cycloalkenyl groups such as a cyclobutenyl group, a cyclopentenyl group and a cyclohexenyl group. A binding site of the alicyclic hydrocarbon group may be at any carbon on the alicyclic ring.

The aromatic hydrocarbon group having from 6 to 18 carbons is preferably an aromatic hydrocarbon group having from 3 to 15 carbons, and more preferably an aromatic hydrocarbon group having from 3 to 12 carbons.

Examples of the aromatic hydrocarbon group having from 6 to 18 carbons include phenyl groups, biphenyl groups and naphthyl groups. A binding site of the aromatic hydrocarbon group may be at any carbon on the aromatic ring.

Examples of the organic group having from 1 to 18 carbons and containing an oxygen atom include an organic group having a hydrogen atom, a carbon atom and an oxygen atom. Among these, a preferable example is an organic group having from 1 to 12 carbons in total and containing a hydrocarbon group and an ether bond, a carbonyl group or an ester bond.

Examples of the organic group having from 1 to 18 carbons in total and containing an ether bond include an alkoxy group having from 1 to 18 carbons, an alkenyloxy group having from 2 to 18 carbons, an alkynyloxy group having from 2 to 18 carbons, an aryloxy group having from 6 to 18 carbons and an alkoxyalkyl group having from 2 to 18 carbons. Specific examples thereof include groups comprising methoxy groups, ethoxy groups, propoxy groups, isopropyloxy groups, butoxy groups, phenoxy groups, propenyloxy groups, cyclohexyloxy groups, methoxy methyl groups, alkyl substituted phenoxy groups (where the number of carbons of the alkyl group is from 1 to 4 and the number of alkyl groups is from 1 to 5), phenyl substituted phenoxy groups (where the number of phenyl groups is 1 or 2), and the like.

Examples of the organic group having from 1 to 18 carbons in total and containing a carbonyl group include an acyl group having from 2 to 18 carbons. Specific examples thereof include groups comprising acetyl groups, propionyl groups, isopropionyl groups, benzoyl groups, and the like.

Examples of the organic group having from 1 to 18 carbons in total and containing an ester bond include an acyloxy group having from 2 to 18 carbons. Specific examples thereof include groups comprising acetyloxy groups, propionyloxy groups, isopropionyloxy groups, benzoyloxy groups, and the like.

Examples of the organic group having from 1 to 18 carbons and containing a nitrogen atom include groups comprising an organic group containing a hydrogen atom, a carbon atom and a nitrogen atom. Specific examples thereof include groups comprising cyano groups, imidazole groups, triazole groups, benzimidazole groups, benzotriazole groups, and the like.

Examples of the organic group having from 1 to 18 carbons and containing an oxygen atom and a nitrogen atom include groups comprising an organic group containing a hydrogen atom, a carbon atom, an oxygen atom and a nitrogen atom. Specific examples thereof include groups comprising oxazole groups, oxadiazole groups, benzoxazole groups, benzoxadiazole groups, and the like.

Furthermore, examples of the monovalent organic group having from 1 to 18 carbons include the groups represented by formulae (5) and (6).

The —OR is preferably an alkyl substituted phenoxy group (where the number of carbons of the alkyl group is from 1 to 4 and the number of alkyl groups is from 1 to 5) or a phenyl substituted phenoxy group (where the number of phenyl groups is 1 or 2); and more preferably an alkyl substituted phenoxy group (where the number of carbons of the alkyl group is from 1 to 4 and the number of alkyl groups is 1 or 2) or a phenyl substituted phenoxy group (where the number of phenyl groups is 1 or 2). The binding site of the substituent on the benzene ring in the alkyl substituted phenoxy group or the phenyl substituted phenoxy group is preferably at the ortho position with respect to the binding site of the —OM on the benzene ring, because obtaining of a polymer comprising the structural unit (i) is facilitated.

The compound (13) is preferably a compound represented by formula (13') below (hereinafter referred to as "compound (13')), and more preferably is a compound represented by formulae (13-1) to (13-4) below. Of these, the compounds represented by formulae (13-2) to (13-4) below are preferable.

[Chem. 26]

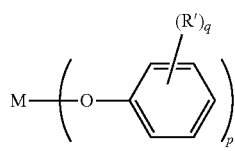

(13')

In formula (13'), M and "p" are synonymous with M and "p" in formula (13); R' is a hydrogen atom, an alkyl group having from 1 to 12 carbons, an alicyclic hydrocarbon group having from 3 to 12 carbons, or an aromatic hydrocarbon group having from 6 to 12 carbons; and "q" is an integer from 0 to 5.

Examples of the alkyl group having from 1 to 12 carbons, the alicyclic hydrocarbon group having from 3 to 12 carbons and the aromatic hydrocarbon group having from 6 to 12 carbons are groups synonymous with the groups exemplified in R in formula (13), that is, the alkyl group having from 1 to 18 carbons, the alicyclic hydrocarbon group having from 3 to 18 carbons and the aromatic hydrocarbon group having from 6 to 18 carbons (with, however, the exception of groups having from 13 to 18 carbons).

The binding site of R' on the benzene ring in formula (13') is preferably at the ortho position with respect to the binding site of the —OM on the benzene ring. When a compound is used in which R' is located at the site described above, reaction (ether exchange reaction) between the ether bond portion of the structural unit (i) and the compound (13'), which accompanies the residue of the compound (13') being bonded at the terminal of the structural unit (i), does not easily occur. Thus, a polymer with a desired structure can easily be synthesized.

[Chem. 27]

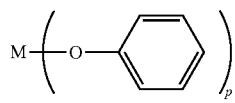

(13-1)

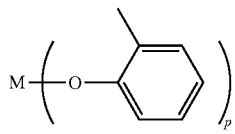

(13-2)

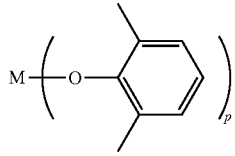

(13-3)

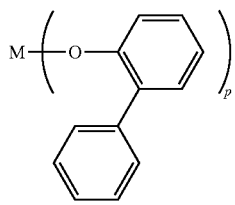

(13-4)

In formulae (13-1) to (13-4), M and "p" are synonymous with M and "p" in formula (13).

In the production method 2, the component (A), the component (B) and the compound (13) are reacted in a system, wherein a commercially available product or a compound prepared in advance may be used as the compound (13). Moreover, a product obtained by reacting a compound represented by H—OR (where R is synonymous with R in formula (13)) with an alkali metal compound or alkali earth metal compound in the system of reaction 2 may be used as the compound (13).

Examples of the alkali metal compound include compounds synonymous with the alkali metal compounds for use in the reaction 1. Examples of the alkali earth metal compound include the compounds for use in the reaction 1 with the exception that the metal atom in the alkali metal compound is replaced with an alkali earth metal atom.

In the reaction 2, an organic solvent is preferably used. Examples of this organic solvent include compounds synonymous with the organic solvents for use in the reaction 1.

Usage ratios of the component (A) and the component (B) when the total of the component (A) and the component (B) equals 100 mol % are preferably such that the component (B) is used in an amount not less than 45 mol % and not more than 55 mol %, more preferably not less than 48 mol % and not more than 50 mol %, and even more preferably not less than 48 mol % and less than 50 mol %; and preferably such that the component (A) is used in an amount not less than 45 mol % and not more than 55 mol %, more preferably not less than 50 mol % and not more than 52 mol %, and even more preferably greater than 50 mol % and not more than 52 mol %.

Usage ratios of the component (A) and the component (B) in the reaction 2 are preferably such that the component (A) exceeds the component (B), and that a molar ratio P of the component (A) with respect to the component (B) is such that $1.00 < P \leq 1.05$, more preferably such that $1.001 \leq P \leq 1.03$, and even more preferably such that $1.003 \leq P \leq 1.02$.

Additionally, typically from 0.005 to 0.3 mol and preferably from 0.0075 to 0.2 mol of the compound (13) is compounded per 1 mol of a total of the component (A) and the component (B).

In cases where the usage amount of the component (A) and the component (B) is in the range described above (1.00<P≤1.05), a usage amount of the compound (13) with respect to the molar difference between the usage amounts of the component (A) and the component (B) is preferably from 1 to 20 times by moles, more preferably from 1.5 to 10 times by moles, and even more preferably from 2 to 5 times by moles.

Reaction temperature and reaction time in the process (a), and reaction temperature and reaction time of the component (A) and the component (B) in the process (b) are synonymous with the reaction temperature and the reaction time in the reaction 1.

In cases where a compound is used in which R in formula (13) is a linear or branched hydrocarbon group or an alicyclic hydrocarbon group, the reaction temperature when reacting the reaction product of the component (A) and the component (B) with the compound (13) in process (b) is preferably from −20 to 100° C., more preferably is from 0 to 80° C., and even more preferably is from 10 to 50° C. The reaction time is preferably from 15 minutes to 100 hours and more preferably from 15 minutes to 24 hours.

In cases where a compound is used in which R in formula (13) is an aromatic hydrocarbon group, the reaction temperature when reacting the reaction product of the component (A) and the component (B) with the compound (13) in process (b) is preferably from 60 to 250° C., more preferably from 80 to 200° C., and even more preferably from 100 to 140° C. The reaction time is preferably 15 minutes to 100 hours, more preferably 1 hour to 24 hours, and particularly preferably 1 to 8 hours.

Production Method 3

Next, production method 3 is described in detail.

Production method 3 comprises a step of reacting the component (A), the component (B) and an alkylating agent (hereinafter referred to as "reaction 3").

Examples of the alkylating agent include dimethylacetamidedimethylacetal, dimethyl sulfate, iodomethane, and the like.

In the reaction 3, an organic solvent is preferably used. Examples of this organic solvent include compounds synonymous with the organic solvents for use in the reaction 1. The reaction temperature or reaction time for the reaction 3 is preferably from −20 to 100° C., more preferably from 0 to 80° C., and even more preferably is from 10 to 50° C. The reaction time is preferably from 15 minutes to 100 hours and more preferably from 15 minutes to 24 hours.

Usage ratios of the component (A) and the component (B) in the reaction 3 are preferably such that the component (B) exceeds the component (A), and that a molar ratio P' of the component (B) with respect to the component (A) is such that 1.00<P'≤1.05, more preferably such that 1.001≤P'≤1.03, and even more preferably such that 1.003≤P'≤1.02.

Additionally, typically from 0.005 to 0.3 mol and preferably from 0.0075 to 0.2 mol of the alkylating agent is compounded per 1 mol of a total of the component (A) and the component (B).

In cases where the usage amount of the component (A) and the component (B) is in the range described above (1.00<P'≤1.05), a usage amount of the alkylating agent with respect to the molar difference between the usage amounts of the component (A) and the component (B) is preferably from 1 to 20 times by moles, more preferably from 1.5 to 10 times by moles, and even more preferably from 2 to 5 times by moles.

Physical Properties and the Like of the Polymer

The polymer of the present invention preferably has a weight average molecular weight (Mw) in terms of polystyrene, as measured using a HLC-8220 GPC apparatus manufactured by TOSOH (column: SuperH2000, SuperH4000; guard column: column with SuperH-L linked; developing solvent: tetrahydrofuran (hereinafter, also referred to as "THF"), of from 5,000 to 500,000, more preferably from 15,000 to 400,000, and even more preferably from 30,000 to 300,000.

<Polymer Composition>

A polymer composition of the present invention comprises the polymer and an organic solvent.

A mixture of the polymer and the organic solvent obtained via production method 1, 2, or 3 can be used as-is as the polymer composition. A film can be produced easily and inexpensively by using such a polymer composition.

The polymer composition can be prepared by separating (refining) the polymer as solid content from the mixture of the polymer and the organic solvent obtained via production method 1, 2, or 3 and, thereafter, re-dissolving the organic solvent. A film with less coloration and excellent light transmittance can be produced by using such a polymer composition.

The isolation (purification) of the polymer as the solid component can be carried out, for example, by reprecipitating the polymer in a poor polymer solvent such as methanol, filtering, and then drying a cake under reduced pressure.

Suitable examples of the organic solvent for dissolving the polymer include methylene chloride, tetrahydrofuran, cyclohexanone, N,N-dimethylformamide, N,N-dimethylacetamide, N-methylpyrrolidone and γ-butyrolactone. In terms of coatability and economical viewpoint, more preferred are methylene chloride, N,N-dimethylacetamide and N-methylpyrrolidone. A single solvent may be used, or a combination of two or more solvents may be used.

The polymer concentration in the polymer composition in which the polymer of the present invention has been dissolved is dependent on the molecular weight of the polymer, but is typically from 5 to 40% by mass and is preferably from 7 to 25% by mass. When the concentration of the polymer of the present invention in the polymer composition is within the range described above, the formation of a thick film is possible, pinholes can hardly occur, and a substrate with excellent surface smoothness can be formed.

Viscosity of the polymer composition is dependent on the molecular weight and the concentration of the polymer, but is typically from 2,000 to 100,000 mPa·s and is preferably from 3,000 to 50,000 mPa·s. When the viscosity of the polymer composition is within the range described above, retentivity of the composition during film formation is excellent, and film thickness is easily controlled, which leads to easy formation of a substrate.

The polymer composition can further comprise an anti-aging agent. Durability of the obtained film can be enhanced as a result of comprising the anti-aging agent.

A preferable example of the anti-aging agent is a hindered phenol-type compound.

Examples of the hindered phenol-type compound that can be used in the present invention include triethyleneglycol-bis[3-(3-tert-butyl-5-methyl-4-hydroxyphenyl)propionate], 1,6-hexanediol-bis[3-(3,5-di-tert-butyl-4-hydroxyphenyl)propionate], 2,4-bis-(n-octylthio)-6-(4-hydroxy-3,5-di-tert-butylanilino)-3,5-triazine, pentaerythritoltetrakis[3-(3,5-tert-butyl 4-hydroxyphenyl)propionate], 1,1,3-tris[2-methyl-4-[3-(3,5-di-tert-butyl-4-hydroxyphenyl)propionyloxy]-5-tert-butylphenyl]butane, 2,2-thio-diethylenebis[3-(3,5-di-tert-butyl-4-hydroxyphenyl)propionate], octadecyl-3-(3,5-di-tert-butyl-4-hydroxyphenyl)propionate, N,N-hexamethylenebis(3,5-di-tert-butyl-4-hydroxy-hydrocinnamamide), 1,3,5-trimethyl-2,4,6-tris(3,5-di-tertbutyl-4-hydroxybenzyl)benzene, tris-(3,5-di-tert-butyl-4-hydroxybenzyl)-isocyanurate, 3,9-bis[2-[3-(3-tert-butyl-4-hydroxy-5-methylphenyl)propionyl oxy]-1,1-dimethylethyl]-2,4,8,10-tetraoxaspiro[5.5]undecane, and the like.

In cases where the anti-aging agent is compounded in the polymer composition, a compounded amount of the anti-aging agent is preferably from 0.01 to 10 parts by weight per 100 parts by weight of the polymer of the present invention.

<Film>

The film of the present invention comprises the polymer of the present invention. The film of the present invention may comprise, in addition to the polymer of the present invention, additives according to desired applications, but it is preferable that the film of the present invention consists essentially of the polymer of the present invention.

The film is preferably produced through a method comprising the steps of forming a coating film by applying the polymer composition on a substrate, and removing the organic solvent from the coating film.

Examples of methods for forming the coating film by applying the polymer on a substrate include roll coating, gravure coating, spin coating, and methods using a doctor blade.

The thickness of the coating film is not particularly limited but, for example, is from 1 to 250 µm, and preferably is from 2 to 150 µm, and more preferably is from 5 to 125 µm.

Examples of the substrate include polyethylene terephthalate (PET) films, SUS plates, and the like.

The step of removing the organic solvent from the coating film can be carried out specifically by heating the coating film. By heating the coating film, the organic solvent in the coating film can be evaporated and thus removed. The heating conditions can be arbitrarily determined depending on the substrate and the polymer, provided that the organic solvent can be removed from the coating film. For example, the heating temperature is preferably from 30° C. to 300° C., more preferably from 40° C. to 250° C., and even more preferably from 50° C. to 230° C.

The heating time is preferably from 10 minutes to 5 hours. The heating may be carried out in two or more stages. A specific method includes drying at a temperature of 30 to 80° C. for from 10 minutes to 2 hours, and then heating at a temperature of from 100 to 250° C. for from 10 minutes to 2 hours. As needed, drying may be carried out under a nitrogen atmosphere or under reduced pressure.

When manufacturing the film, after removing the organic solvent from the coating film, the solvent-free coating film is preferably calcinated. By including a calcinating step when manufacturing the film, a film with low thermal shrinkage can be produced.

When calcinating, the coating film formed on the substrate may be calcinated together with the substrate but, from the standpoint that the properties of the substrate does not be affected, the coating film formed on the substrate is preferably delaminated from the substrate and, thereafter calcinated. The process for removing the organic solvent from the coating film may be carried out by calcinating the coating film or, alternately a separate step of removing the organic solvent prior to the calcinating step may be included. A step of removing the organic solvent from the coating film prior to delaminating the coating film from the substrate is preferably included when calcinating the coating film that has been delaminated from the substrate.

The calcinating step is preferably carried out at a specific temperature. The calcinating temperature is preferably from 210° C. to 350° C., more preferably from 220° C. to 330° C., and even more preferably from 230° C. to 320° C. Calcinating time is preferably from 10 minutes to 5 hours.

The calcinating atmosphere is not particularly limited, but the calcinating is preferably carried out under normal atmospheric conditions or under an atmosphere containing an inert gas, or the like; and more preferably is carried out under an atmosphere containing an inert gas.

From the perspective of coloration, examples of the inert gas include nitrogen, argon, helium, and the like, of which nitrogen is preferable.

Depending on the type of substrate used, the obtained film can be delaminated from the substrate and used or, alternatively, can be used as-is, without delaminating.

Physical Properties and the Like of the Film

The film of the present invention preferably has a glass transition temperature (Tg) of 230 to 350° C., more preferably 240 to 330° C., and still more preferably 250 to 300° C. The glass transition temperature (Tg) is determined from a measurement taken under nitrogen at a heating rate of 20° C./min using a Thermo Plus DSC8230, manufactured by Rigaku Corporation. The film of the present invention, by having such a glass transition temperature, has excellent heat resistance.

Thickness of the film of the present invention may be appropriately selected depending on the application thereof, but is preferably from 1 to 250 µm and more preferably from 2 to 150 µm. When the film of the present invention is used as a substrate, the thickness is particularly preferably from 10 to 125 µm.

When the thickness of the film of the present invention is 30 µm, the film preferably has a total light transmittance in accordance with JIS K7105 transparency testing methods of not less than 85% and more preferably not less than 88%. The total light transmittance is measurable using a haze meter, SC-3H, manufactured by Suga Test Instruments Co., Ltd. Particularly high light transmittance can be obtained when the transmittance of the film of the present invention is within this range.

When the thickness of the film of the present invention is 30 µm, the film preferably has a total light transmittance in accordance with JIS K7105 transparency testing methods of not less than 82%, after calcinating the film for 1 hour at 270° C. The total light transmittance is measurable using a haze meter, SC-3H, manufactured by Suga Test Instruments Co., Ltd. Particularly high light transmittance can be obtained, even when exposed to high temperatures, when the total light transmittance is within this range.

When a solution obtained by calcinating the film of the present invention for 1 hour at 230° C. and then dissolving said calcinated film in DMAc, the YI (yellow index) value of said solution in which the concentration of the polymer is 10 wt % is preferably not greater than 7, more preferably not greater than 5, and even more preferably not greater than 3.5. A film that is not prone to coloration can be obtained when the YI value is within this range.

When a solution is obtained by calcinating the film of the present invention for 1 hour at 230° C. and further calcinating for 1 hour at 270° C., then dissolving said calcinated film in DMAc, the YI (yellow index) value of said solution in which the concentration of the polymer is 10 wt % is preferably not greater than 15, more preferably not greater than 10, and even more preferably not greater than 8. A film that is not prone to coloration, even under high temperatures, can be obtained when the YI value is within this range.

The film of the present invention has low coloration and excellent light transmittance and, therefore, can be suitably used as a film for a light guide plate, a film for a polarizing plate, a film for a display, a film for an optical disk, a transparent conductive film, a waveguide plate, an optical filter, a back grinding tape, a transparent flexible printed circuit board, a substrate for an organic semiconductor, an optical member for a camera, a connector member, transport tape, an illumination member, a solar cell member, and the like.

Additionally, the polymer and the polymer composition of the present invention can be suitably used primarily in the manufacture of the film described above.

EXAMPLES

Hereinafter, the present invention is specifically described with reference to Examples.
(1) Structural Analysis The structural analysis of polymers obtained in the following Examples and Comparative Examples was carried out by IR (ATR method, FT-IR, 6700, manufactured by NICOLET) and by NMR (AVANCE500, manufactured by Brukar Corporation).
(2) Weight Average Molecular Weight, Number Average Molecular Weight (Mw) and Molecular Weight Distribution The weight average molecular weight of the polymers obtained in the following Examples and Comparative Examples was measured using a HLC-8220 GPC apparatus manufactured by Tosoh Corporation (column: SuperH2000, SuperH4000; guard column: column with SuperH-L linked; developing solvent: THF).
(3) Glass Transition Temperature (Tg)

The glass transition temperature (Tg) of the obtained films was determined from a measurement taken under nitrogen at a heating rate of 20° C./min using a Thermo Plus DSC8230, manufactured by Rigaku Corporation.
(4) Optical Properties The total light transmittance of films obtained in the following Examples and Comparative Examples was measured in accordance with JIS K7105 transparency testing methods. The total light transmittance was measured using a haze meter, SC-3H, manufactured by Suga Test Instruments Co., Ltd.

A YI value (YI before heating) of a solution was measured using a UV-vis Spectrophotometer (V-570, manufactured by JASCO Corporation; illuminant C; viewing angle: 10 degrees). The solution was obtained by dissolving the film obtained in the following Examples and Comparative Examples in DMAc such that the concentration of the polymer was 10 wt %.

The total light transmittance of each of the films was measured using the haze meter SC-3H described above after calcinating the films obtained in the following Examples and Comparative Examples at 270° C. for 1 hour.

A YI value (YI after heating) of the solution was measured using the UV-vis Spectrophotometer described above. The solution was obtained by calcinating the film obtained in the following Examples and Comparative Examples at 270° C. for 1 hour and dissolving the calcined film in DMAc such that the concentration of the polymer was 10 wt %.

Example 1

78.4358 g (223.84 mmol) of 9,9-bis(4-hydroxyphenyl)fluorene, 30.8593 g (221.85 mmol) of 2,6-difluorobenzonitrile, 34.031 g (246.24 mmol) of potassium carbonate, 345 g of DMAc (N,N-dimethylacetamide) and 86 g of toluene were added to a 1 L four-neck flask. Then, a thermometer, a stirrer, a nitrogen introducing tube, a Dean-Stark tube, and a cooling tube were attached to the 1 L four-neck flask.

Next, the flask was purged with nitrogen and, thereafter, the resultant solution was reacted for 4 hours at 128° C. while constantly removing generated water via the Dean-Stark tube. Thus, a polymer 1' was synthesized.

Then, 0.7230 g (5.97 mmol) of 4-fluorobenzonitrile was added and the resultant solution was reacted for 2 hours at 128° C.

After the solution was cooled to room temperature (25° C.), generated salt was removed using filter paper. The filtrate was poured into methanol in order to reprecipitate. The solution was subjected to filtration to isolate cake (residue). The resultant cake was vacuum dried at 60° C. overnight. Thus, a white powder (polymer 1; yield weight: 96 g, yield: 96%) was obtained.

The resultant polymer 1 was subjected to structural analysis, and measurements of weight average molecular weight and number average molecular weight. The results are shown in Table 1.

Terminal group analysis of the obtained polymer was performed as follows.

300 mg of the obtained polymer 1 (white powder) and 300 mg of the obtained polymer 1' (white powder) were each dissolved in 1 g of d-chloroform. Then, $^1$H-NMR was measured using an AVANCE500 (manufactured by Bruker corporation). As a result of the measurements, it was discovered that, by reacting the polymer 1' and 4-fluorobenzonitrile, the aromatic 1H at the ortho position of the terminal OH at 6.62, 6.63 and 6.89 ppm disappeared, and the aromatic 2H at the meta position of terminal OH at 6.91 ppm disappeared.

Additionally, stretching vibration of the aromatic at 3070 $cm^{-1}$, stretching vibration between the C≡N of the aromatic nitrile having a conjugated bond at 2233 $cm^{-1}$, in-plane skeletal vibration of the aromatic at 1578, 1500 and 1457 $cm^{-1}$, asymmetrical stretching vibration of the =C—O—C= of the phenol ether at 1288 $cm^{-1}$, C—H in-plane bending vibration of the p-substituted benzene at 1242, 1207 and 1160 $cm^{-1}$, and =C—H out-of-plane bending vibration of the fused ring aromatic hydrocarbon at 741 and 833 $cm^{-1}$ were observed from the IR chart of the polymer 1 after the reaction with the 4-fluorobenzonitrile.

The resultant polymer 1 was redissolved in DMAc to obtain a polymer composition having a polymer concentration of 20% by mass. The polymer composition was applied using a doctor blade on a substrate constituted by polyethylene terephthalate (PET), and was dried at 80° C. for 30 minutes and then dried at 150° C. for 60 minutes. Thus, a film was formed. Then, the film was delaminated from the PET substrate. Thereafter, the film was fixed to a metal frame and further calcinated for 60 minutes at 230° C. Thus, a film having a thickness of 30 μm was obtained. The physical properties of the obtained film were measured. The results are shown in Table 1.

Example 2

Other than replacing the 9,9-bis(4-hydroxyphenyl)fluorene (223.84 mmol) in Example 1 with 9,9-bis(4-hydroxyphenyl)fluorene (179.07 mmol) and 2,2-bis(3-hexyl-4-hydroxyphenyl)propane (44.77 mmol), a polymer 2' and a polymer 2 were synthesized in the same manner as described in Example 1. Then, a film was formed using the polymer 2. The measurement results of the obtained polymer 2 and the film are shown in Table 1.

Example 3

Other than replacing the 9,9-bis(4-hydroxyphenyl)fluorene (223.84 mmol) in Example 1 with 9,9-bis(4-hydroxyphenyl)fluorene (156.69 mmol) and 2,2-bis(4-hydroxyphenyl)-1,1,1,3,3,3-hexafluoropropane (67.15 mmol), a polymer 3' and a polymer 3 were synthesized in the same manner as described in Example 1. Then, a film was formed using the polymer 3. The measurement results of the obtained polymer 3 and the film are shown in Table 1.

Example 4

Other than replacing the 4-fluorobenzonitrile (5.97 mmol) in Example 1 with 4-chlorobenzonitrile (5.97 mmol), a polymer 4' and a polymer 4 were synthesized in the same manner as described in Example 1. Then, a film was formed using the polymer 4. The measurement results of the obtained polymer 2 and the film are shown in Table 1.

Comparative Examples 1 to 3

Other than not using the 4-fluorobenzonitrile in each of Examples 1 to 3, polymers ce1' to ce3' and polymers ce1 to ce3 (Comparative Examples 1 to 3, respectively) were synthesized in the same manner as described in Examples 1 to 3. Then, films using each of the polymers ce1 to ce3 were formed. The measurement results of the obtained polymers ce1 to ce3 and the films are shown in Table 1. Heat coloration resistance test results (YI values after heating) for the Comparative Examples were significantly inferior compared to the Examples.

Example 5

77.7373 g (221.85 mmol) of 9,9-bis(4-hydroxyphenyl)fluorene, 31.1366 g (223.84 mmol) of 2,6-difluorobenzonitrile, 33.728 g (244.03 mmol) of potassium carbonate, 345 g of DMAc and 86 g of toluene were added to a 1 L four-neck flask. Then, a thermometer, a stirrer, a nitrogen introducing tube, a Dean-Stark tube and a cooling tube were attached.

Next, the flask was purged with nitrogen and, thereafter, the resultant solution was reacted for 4 hours at 128° C. while constantly removing generated water via the Dean-Stark tube. Thus, a polymer 5' was synthesized.

A solution containing the obtained polymer 5' was cooled to room temperature (25° C.) and then 0.215 g (3.98 mmol) of sodium methoxide was added. Then, the solution was reacted for 6 hours at 25° C.

After the solution was cooled to room temperature (25° C.), generated salt was removed using filter paper. The filtrate was poured into methanol in order to reprecipitate. The solution was subjected to filtration to isolate cake (residue). The resultant cake was vacuum dried at 60° C. overnight. Thus, a white powder (polymer 5; yield weight: 98 g; yield: 98%) was obtained.

Terminal group analysis of the obtained polymer was performed as follows.

Figure 2:
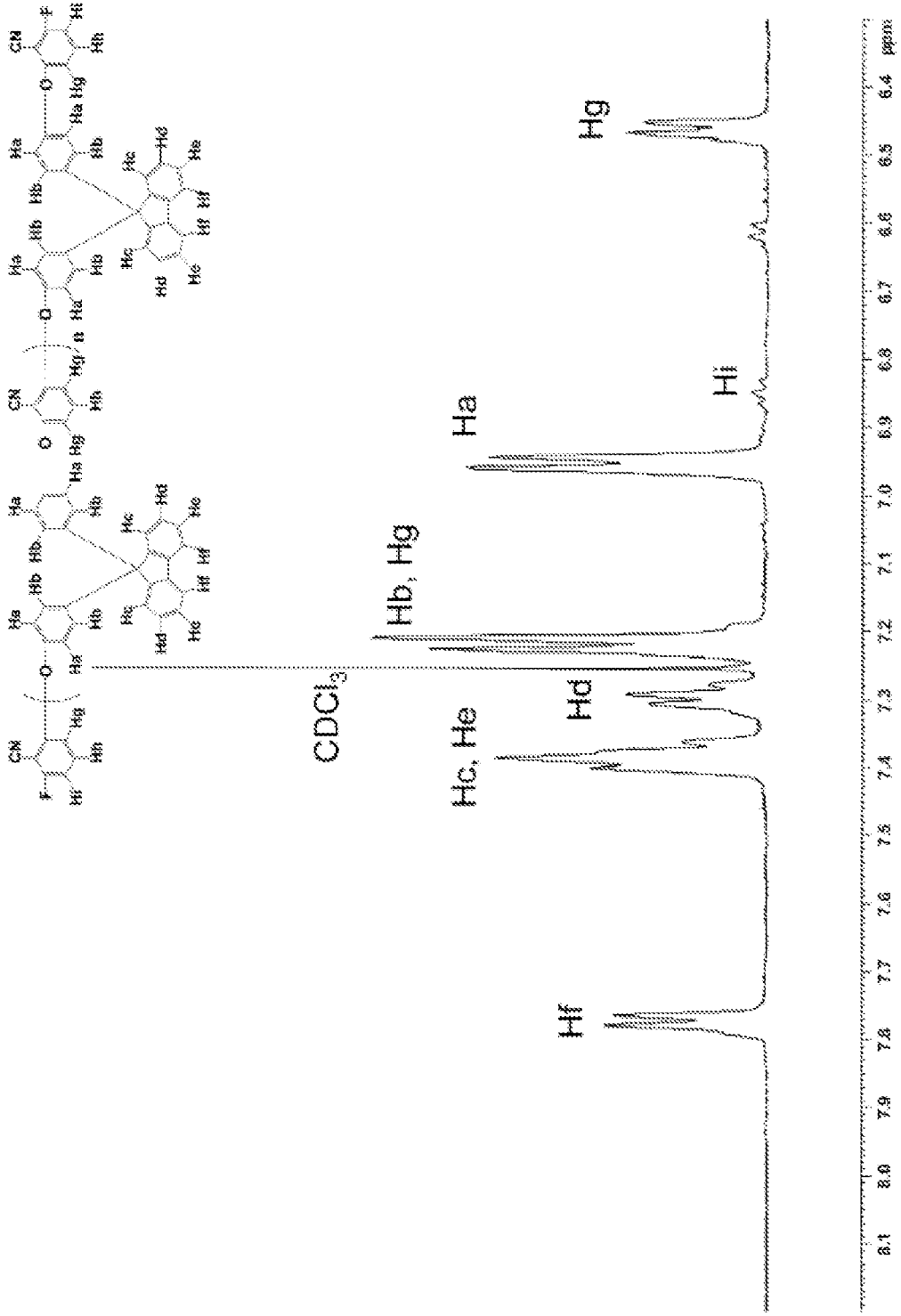
FIG. 2 illustrates the $^1$H-NMR spectrum of a polymer 5' obtained in Example 5.

300 mg of the obtained polymer 5 (white powder) and 300 mg of the obtained polymer 5' (white powder) were each dissolved in 1 g of d-chloroform. Then, $^1$H-NMR was measured using an AVANCE500 (manufactured by Bruker Corporation). Measurement results for the polymer 5 after reacting the polymer 5' with sodium methoxide are shown in FIG. 1. Measurement results for the polymer 5' before reacting with sodium methoxide are shown in FIG. 2. From FIGS. 1 and 2, it was found that, by reacting the polymer 5' and sodium methoxide, the aromatic 1H at the ortho position of the terminal F at 6.83, 6.85 and 6.86 ppm disappeared; and that the aromatic 1H at the ortho position of the terminal methoxy group at 6.40 and 6.42 ppm disappeared.

Figure 3:
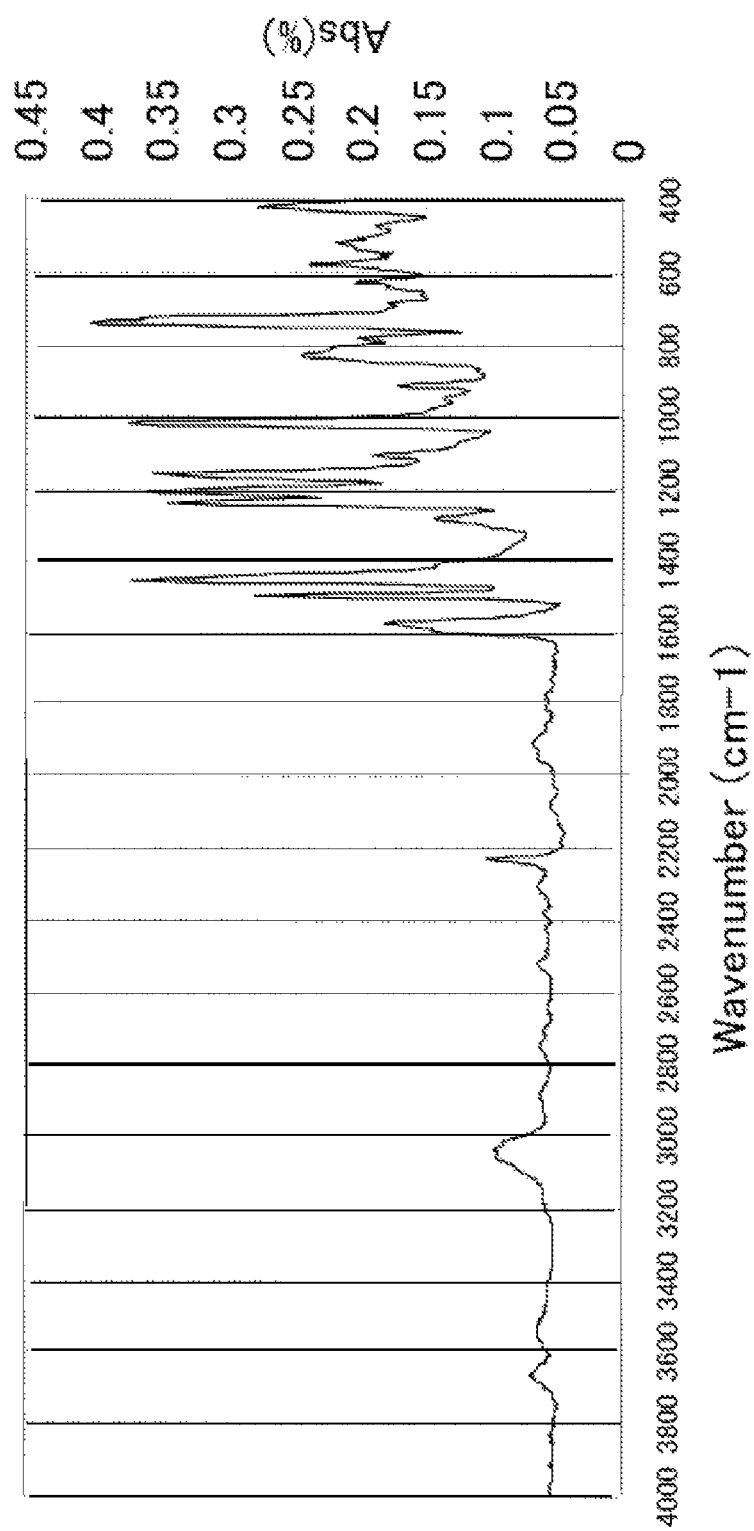
FIG. 3 illustrates the IR spectrum of the polymer 5 obtained in Example 5.

FIG. 3 is an IR chart of the polymer 5 after the reaction of the polymer 5' and the sodium methoxide. Stretching vibration of the aromatic at 3070 cm$^{-1}$, C—H stretching vibration of the methyl ether at 2896 cm$^{-1}$, stretching vibration between the C≡N of the aromatic nitrile having a conjugated bond at 2233 cm$^{-1}$, in-plane skeletal vibration of the aromatic at 1578, 1500 and 1457 cm$^{-1}$, asymmetrical stretching vibration of the =C—O—C= of the phenol ether at 1288 cm$^{-1}$, C—H in-plane bending vibration of the p-substituted benzene at 1242, 1207 and 1160 cm$^{-1}$, and =C—H out-of-plane bending vibration of the fused ring aromatic hydrocarbon at 741 and 833 cm$^{-1}$ were observed.

The resultant polymer 5 was redissolved in DMAc to obtain a polymer composition having a polymer concentration of 20% by mass. The polymer composition was applied using a doctor blade on a substrate constituted by polyethylene terephthalate (PET), and was dried at 80° C. for 30 minutes and then dried at 150° C. for 60 minutes. Thus, a film was formed. Then, the film was delaminated from the PET substrate. Thereafter, the film was fixed to a metal frame and further calcinated for 60 minutes at 230° C. Thus, a film having a thickness of 30 μm was obtained.

The physical properties of the obtained polymer 5 and the film were measured in the same manner as in Example 1. The results are shown in Table 1.

The retardation of the obtained film was measured using a RETS spectroscope manufactured by Otsuka Electronics Co., Ltd. The standard wavelength used with measuring was 589 nm, and retardation was 2 nm.

Example 6

Other than replacing the 9,9-bis(4-hydroxyphenyl)fluorene (221.85 mmol) in Example 5 with 9,9-bis(4-hydroxyphenyl)fluorene (177.48 mmol) and 2,2-bis(3-hexyl-4-hydroxyphenyl)propane (44.37 mmol), a polymer 6' and a polymer 6 were synthesized in the same manner as described in Example 5. Then, a film was formed using the polymer 6. The measurement results of the obtained polymer 6 and the film are shown in Table 1.

Example 7

Other than replacing the 9,9-bis(4-hydroxyphenyl)fluorene (221.85 mmol) in Example 5 with 9,9-bis(4-hydroxyphenyl)fluorene (155.27 mmol) and 2,2-bis(4-hydroxyphenyl)-1,1,1,3,3,3-hexafluoropropane (66.55 mmol), a polymer 7' and a polymer 7 were synthesized in the same manner as described in Example 5. Then, a film was formed using the polymer 7. The measurement results of the obtained polymer 7 and the film are shown in Table 1.

Example 8

0.5618 g (5.97 mmol) of phenol, 0.9076 g (6.567 mmol) of potassium carbonate, 3.45 g of DMAc and 8.6 g of toluene were added to a 1 L four-neck flask to which a thermometer, a stirrer, a nitrogen introducing tube, a Dean-Stark tube and a cooling tube were attached. The solution was nitrogen bubbled for 20 minutes while stirring at 250 rpm and 25° C. Then, the solution was reacted for 4 hours under a nitrogen stream with the bath temperature set to 128° C. while constantly removing generated liquid mixture of water and toluene via the Dean-Stark tube. Thus, a potassium phenoxide solution was produced. 4.24 g of a solution containing 0.7892 g (5.97 mmol) of the resultant potassium phenoxide was obtained.

Other than adding 2.83 g (3.98 mmol) of the potassium phenoxide solution in place of the sodium methoxide to the solution containing the polymer 5' and reacting for 2 hours at 128° C., a polymer 8 was synthesized in the same manner as described in Example 5.

Other than using the obtained polymer 8, the physical properties of the film obtained in the same manner as described in Example 5 were measured in the same manner described in Example 5. The results are shown in Table 1.

Example 9

Other than implementing the changes described below in relation to the synthesis of the polymer 2 in the Examples, a polymer 9 was synthesized in the same manner as described in Example 5. Other than using the polymer 9 obtained in the same manner as described in Example 5, the physical properties of the obtained film were measured in the same manner described in Example 5. The results are shown in Table 1.

77.7373 g (221.85 mmol) of 9,9-bis(4-hydroxyphenyl)fluorene, 31.1366 g (223.84 mmol) of 2,6-difluorobenzonitrile, 0.6774 g (3.98 mmol) of 2-phenylphenol, 33.728 g (244.03 mmol) of potassium carbonate, 345 g of DMAc and 86 g of toluene were added to a 1 L four-neck flask. Then, a thermometer, a stirrer, a nitrogen introducing tube, a Dean-Stark tube and a cooling tube were attached.

Next, the flask was purged with nitrogen and, thereafter, the resultant solution was reacted for 6 hours at 128° C. while constantly removing generated water via the Dean-Stark tube.

After the solution was cooled to room temperature (25° C.), generated salt was removed using filter paper. The filtrate was poured into methanol in order to reprecipitate. The solution was subjected to filtration to isolate cake (residue). The resultant cake was vacuum dried at 60° C. overnight. Thus, a white powder (polymer 9) (amount yielded: 94 g, yield: 94%).

Example 10

Other than replacing the 0.6774 g of 2-phenylphenol with 0.4862 g (3.98 mol) of 2,6-dimethylphenol, a polymer 10 was synthesized in the same manner as described in Example 9. Other than using the obtained polymer 10, the physical properties of the film obtained in the same manner as described in Example 5 were measured in the same manner described in Example 5. The results are shown in Table 1.

Example 11

Other than replacing the 77.7373 g (221.85 mmol) of 9,9-bis(4-hydroxyphenyl)fluorene with 83.9601 g (221.85 mmol) of 9,9-bis(4-hydroxy-3-methylphenyl)fluorene, a polymer 11 was synthesized in the same manner as described in Example 9. Other than using the obtained polymer 11, the physical properties of the film obtained in the same manner as described in Example 5 were measured in the same manner described in Example 5. The results are shown in Table 1.

Comparative Examples 4 to 6

Other than not using the sodium methoxide in each of Examples 5 to 7, polymers ce4' to ce6' and polymers ce4 to ce6 (Comparative Examples 4 to 6, respectively) were synthesized in the same manner as described in Example 1. Then, films using each of the polymers ce4 to ce6 were formed. The measurement results of the obtained polymers ce4 to ce6 and the films are shown in Table 1. Heat coloration resistance test results (YI after heating) for the Comparative Examples were significantly inferior compared to the Examples.

TABLE 1

|  | Basic Physical Properties | | | | Optical properties | | | |
| --- | --- | --- | --- | --- | --- | --- | --- | --- |
|  | Mw [—] | Mn [—] | Mw/Mn [—] | Tg [° C.] | Total light transmittance before heating [%] | Total light transmittance after heating [%] | YI before heating [—] | YI after heating [—] |
| Example 1 | 81,900 | 24,000 | 3.41 | 278 | 89 | 89 | 3 | 5 |
| Example 2 | 124,000 | 34,000 | 3.65 | 252 | 89 | 89 | 3 | 6 |
| Example 3 | 55,000 | 18,000 | 3.06 | 251 | 88 | 89 | 3 | 6 |
| Example 4 | 81,900 | 24,000 | 3.41 | 278 | 89 | 89 | 3 | 6 |
| Comparative Example 1 | 81,900 | 24,000 | 3.41 | 278 | 87 | 84 | 12 | 35 |
| Comparative Example 2 | 124,000 | 34,000 | 3.65 | 252 | 88 | 83 | 10 | 30 |
| Comparative Example 3 | 55,000 | 18,000 | 3.06 | 251 | 86 | 82 | 20 | 45 |
| Example 5 | 78,000 | 20,700 | 3.77 | 278 | 89 | 89 | 3 | 5 |
| Example 6 | 118,000 | 29,300 | 4.03 | 252 | 89 | 89 | 3 | 6 |
| Example 7 | 61,200 | 17,500 | 3.50 | 251 | 88 | 89 | 3 | 6 |
| Example 8 | 78,000 | 20,700 | 3.77 | 278 | 89 | 89 | 3 | 6 |
| Example 9 | 92,500 | 25,600 | 3.61 | 278 | 89 | 89 | 3 | 4 |
| Example 10 | 84,900 | 23,000 | 3.69 | 278 | 89 | 89 | 3 | 5 |
| Example 11 | 72,500 | 21,800 | 3.33 | 261 | 89 | 89 | 3 | 5 |
| Comparative Example 4 | 78,000 | 20,700 | 3.77 | 278 | 89 | 88 | 6 | 12 |
| Comparative Example 5 | 118,000 | 29,300 | 4.03 | 252 | 89 | 88 | 5 | 10 |
| Comparative Example 6 | 61,200 | 17,500 | 3.50 | 251 | 88 | 86 | 12 | 19 |

The invention claimed is:

1. A polymer comprising: at least one structural unit (i) selected from the group consisting of a structural unit represented by formula (1) and a structural unit represented by formula (2), wherein a terminal structure of the polymer is independently a structural unit represented by formula (5) or a structural unit represented by formula (6):

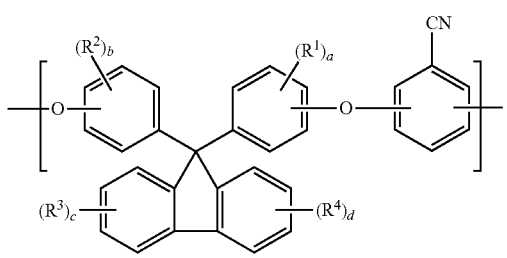
(1)

in formula (1), $R^1$ to $R^4$ are each independently a monovalent organic group having from 1 to 12 carbons; and "a" to "d" are each independently an integer from 0 to 4;

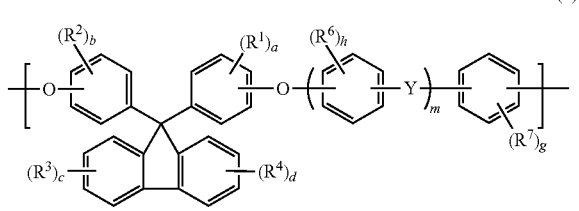
(2)

in formula (2), $R^1$ to $R^4$ and "a" to "d" are each independently as defined in formula (1); Y is a single bond, —SO$_2$— or >C=O; $R^7$ and $R^8$ are each independently a halogen atom, a monovalent organic group having from 1 to 12 carbons or a nitro group; "g" and "h" are each independently an integer from 0 to 4; and "m" is 0 or 1; provided that when "m" is 0, $R^7$ is not a nitrile group;

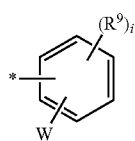
(5)

in formula (5), W is an electron-withdrawing group; $R^9$ is independently a monovalent hydrocarbon group having from 1 to 12 carbons, an organic group having from 1 to 12 carbons and comprising an oxygen atom, an imidazole group, a triazole group, a benzimidazole group or a benzotriazole group; "i" is an integer from 0 to 4; and the symbol "*" indicates a bonding site; and

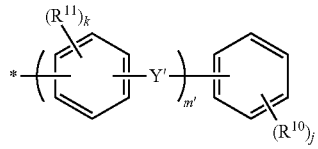
(6)

in formula (6), Y' is a single bond, —SO$_2$— or >C=O; $R^{10}$ and $R^{11}$ are each independently a monovalent organic group having from 1 to 12 carbons or a nitro group; "j" is an integer from 0 to 5; "k" is an integer from 0 to 4; "m'" is 0 or 1; and the symbol "*" indicates a bonding site.

2. The polymer according to claim 1, further comprising at least one structural unit (ii) selected from the group consisting of a structural unit represented by formula (3) and a structural unit represented by formula (4):

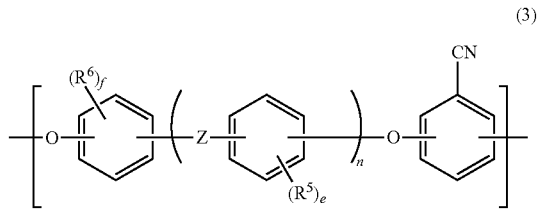
(3)

in formula (3), $R^5$ and $R^6$ are each independently a monovalent organic group having from 1 to 12 carbons; Z is a single bond, —O—, —S—, —SO$_2$—, >C=O, —CONH—, —COO— or a divalent organic group having from 1 to 12 carbons; "e" and "f" are each independently an integer from 0 to 4; and "n" is an integer from 0 to 2; and

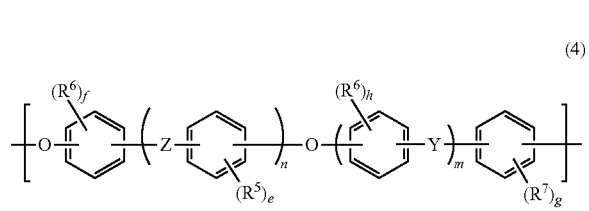
(4)

in formula (4), $R^7$, $R^8$, Y, "m", "g" and "h" are each independently as defined in formula (2); and $R^5$, $R^6$, Z, "n", "e" and "f" are each independently as defined in formula (3); provided that when "m" is 0, $R^7$ is not a nitrile group.

3. The polymer according to claim 2, wherein a molar ratio of the structural unit (i) to the structural unit (ii) in the polymer is from 50:50 to 100:0.

4. The polymer according to claim 1, wherein a weight average molecular weight of the polymer determined by gel permeation chromatography (GPC) relative to polystyrene is from 5,000 to 500,000.

5. A method for manufacturing the polymer, the method comprising: reacting a component (A), a component (B), and a component (C) to produce the polymer described in claim 1, the component (A) comprising at least one compound selected from the group consisting of a compound represented by formula (7) and a compound represented by formula (8);

the component (B) comprising a compound represented by formula (9), the component (C) comprising at least one compound selected from the group consisting of a compound represented by formula (11) and a compound represented by formula (12):

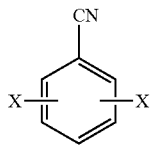
(7)

in formula (7), X are each independently a halogen atom;

[Chem. 8]

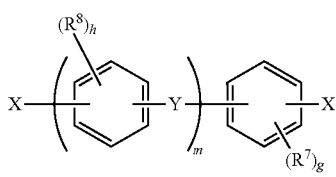
(8)

in formula (8), $R^7$, $R^8$, Y, "m", "g" and "h" are each independently as defined in formula (2); and X are each independently as defined in formula (7); provided that when "m" is 0, $R^7$ is not a nitrile group;

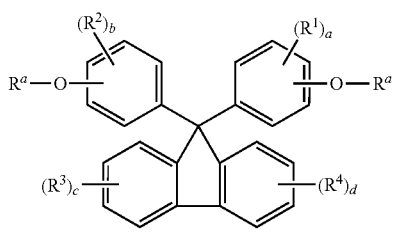
(9)

in formula (9), $R^a$ are each independently a hydrogen atom, a methyl group, an ethyl group, an acetyl group, a methanesulphonyl group or a trifluoromethylsulphonyl group; and $R^1$ to $R^4$ and "a" to "d" are each independently as defined in formula (1);

[Chem. 10]

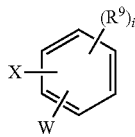
(11)

in formula (11), W, $R^9$ and "i" are each independently as defined in formula (5); and X is a halogen atom; and

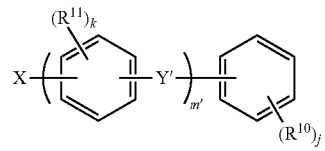
(12)

in formula (12), Y', $R^{10}$, $R^{11}$, "j", "k" and "m'" are each independently as defined in formula (6); and X is a halogen atom.

6. A method for manufacturing the polymer, the method comprising: reacting a component (A), a component (B), and a compound (D) to produce the polymer described in claim 1, the component (A) comprising at least one compound selected from the group consisting of a compound represented by formula (7) and a compound represented by formula (8), the component (B) comprising a compound represented by formula (9), the compound (D) represented by formula (13):

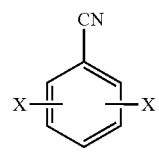
(7)

in formula (7), X are each independently a halogen atom;

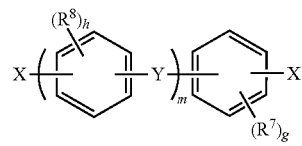
(8)

in formula (8), $R^7$, $R^8$, Y, "m", "g" and "h" are each independently as defined in formula (2); and X are each independently as defined in formula (7); provided that when "m" is 0, $R^7$ is not a nitrile group;

$$M(\text{—}OR)_p \quad (13)$$

in formula (13), M is a metal atom; R is a monovalent organic group having from 1 to 18 carbons; and "p" indicates the valency of the metal atom.

7. A polymer composition comprising the polymer described in claim 1 and an organic solvent.

8. A film comprising the polymer described in claim 1.

9. The film according to claim 8, wherein the film, when having a thickness of 30 μm, has a total light transmittance in accordance with JIS K7105 transparency testing methods of not less than 85%.

10. The film according to claim 8, wherein when the film is dissolved in dimethylacetamide to obtain a solution and the concentration of the polymer in the solution is 10 wt %, a YI value (yellow index) of the solution is not greater than 7.

11. The film according to claim 8, wherein, when the film has a thickness of 30 μm, retardation (Rth) in a thickness direction is not greater than 200 nm.

12. The polymer according to claim 1, wherein a molar ratio of the structural unit represented by formula (1) to the structural unit represented by formula (2) in the polymer is from 50:50 to 100:0.

13. The polymer according to claim 1, wherein a molar ratio of the structural unit represented by formula (1) to the structural unit represented by formula (2) in the polymer is from 80:20 to 100:0.

14. The polymer according to claim 1, wherein in formula (5), W represents a nitro group or a nitrile group.

15. The polymer according to claim 2, wherein a molar ratio of the structural unit (i) to the structural unit (ii) in the polymer is from 80:20 to 100:0.

16. The polymer according to claim 2, wherein an amount of a total of the structural unit (i) and the structural unit (ii) is no less than 70 mol % of a total of structural units constituting the polymer.

17. The polymer according to claim 2, wherein an amount of a total of the structural unit (i) and the structural unit (ii) is no less than 95 mol % of a total of structural units constituting the polymer.

* * * * *